United States Patent [19]

Trow et al.

[11] Patent Number: 5,461,706
[45] Date of Patent: Oct. 24, 1995

[54] LIGHTING EFFECTS FOR DIGITAL VIDEO EFFECTS SYSTEM

[75] Inventors: Andrew I. Trow, Winchester; Howard J. Teece, Basingstoke, both of United Kingdom

[73] Assignee: Sony United Kingdom Ltd., Staines, United Kingdom

[21] Appl. No.: 38,642

[22] Filed: Mar. 29, 1993

[30]   Foreign Application Priority Data

Apr. 24, 1992 [GB] United Kingdom ............... 9208929
Jul. 24, 1992 [GB] United Kingdom ............... 9215817

[51] Int. Cl.$^6$ .................................................. G06F 15/62
[52] U.S. Cl. ................................................................ 395/125
[58] Field of Search ................................. 395/126, 127,
395/129, 132, 141, 125, 133, 135; 345/113,
114, 120, 122

[56]   References Cited

U.S. PATENT DOCUMENTS

| | | | |
|---|---|---|---|
| 4,796,201 | 1/1989 | Wake | 364/518 |
| 4,935,879 | 6/1990 | Ueda | 364/522 |
| 4,949,286 | 8/1990 | Ohba | 364/521 |
| 5,175,808 | 12/1992 | Sayre | 395/133 |
| 5,239,628 | 8/1993 | Sato et al. | 395/119 |
| 5,255,352 | 10/1993 | Falk | 395/125 |
| 5,271,093 | 11/1993 | Hata et al. | 395/120 |

*Primary Examiner*—Phu K. Nguyen
*Attorney, Agent, or Firm*—William S. Frommer; Alvin Sinderbrand

[57]   ABSTRACT

Lighting effects for a digital video effects system are provided through a write-side process. An array of pixel values from a source video image is mapped onto an object surface to produce an output image by storing the input image pixels in a memory and then selectively addressing the memory in accordance with a function defining the object surface to form output pixels representative of the source video image mapped onto the object surface. Before storage in the memory, a write side lighting processor modifies the intensity of the source pixels. The source images are logically divided into tiles, a tile mapper calculates a mapping of the corners of the tiles onto the object surface and a lighting factor generator uses the mapped corner points to compute normals for individual pixels using interpolation. The dot product of the interpolated normals are computed and mathematically combined with other factors to generate lighting intensity modification factors for each of the pixels of the source image. These factors are used to control the lighting processor. The pixels output by the lighting processor can be selectively filtered before storage in the memory to mitigate aliasing effects.

10 Claims, 18 Drawing Sheets

LIGHTING EFFECTS FOR DIGITAL VIDEO EFFECTS SYSTEM

BACKGROUND OF THE INVENTION

1. Field of the Invention

This invention relates to a digital video effects system for the manipulation of pictures represented by video signals. In particular it relates to the provision of lighting effects in such a system.

2. Description of the Prior Art

The art of manipulating pictures represented by digital video signals is well established. In essence the manipulation is accomplished by: digitising an analogue video signal by sampling it and converting each sample into a binary word of, for example, 8 or 10 bits representing that sample; storing fields or frames of the digitised signal in memory; and controlling either the reading from or the writing to the memory so as to produce from each field or frame a picture that differs from that represented by the input video signal in that at least one geometrical parameter thereof is changed. Such geometrical parameter may, for example, comprise the location of the picture along one or more of up to three axes and/or the angular position of the picture about one or more axes. Other such parameters may comprise the size of the picture (in the horizontal and/or vertical direction thereof), the extent of shearing of the picture, and the perspective of the picture.

FIG. 1 of the accompanying drawings shows in simplified block diagram form the general overview of a typical digital video effects system for effecting such manipulation of a picture. The general kind of apparatus now to be described with reference to FIG. 1 has been embodied in a variety of known propriety items of digital video effects equipment, and the operation and construction thereof is well known to those skilled in the art. The digital video effects system comprises a digital video effects unit, which is designated 10 in FIG. 1, and a control unit 24.

A video signal $V_1$ representing a picture $P_1$ that is to be manipulated is input into the digital video effects unit 10 at 11. In this prior art digital video effects unit, manipulation of the input picture $P_1$ is performed by controlling the read addresses to the memory 14, although write side address mapping is also known. This control of the read side addresses is effected by the address generator 20.

As the mapping process may involve compression of the picture, and, in the absence of corrective measures, compression of the picture can give rise to aliasing which will degrade the quality of the output image, a filter 12 is provided to compensate for the effects of compression, A filter controller 18 determines local scaling factors representative of the amount of compression for localised areas of the image, these local scaling factors being used to control the filter 12 to apply appropriate amounts of filtering to respective areas of the image.

A pixel interpolator 14 can be provided to enable output pixel values to be computed where the address generator 20 does not generate a one-to-one mapping between a storage location in the memory 13 and the output pixels.

A synchronisation delay 15 allows the data output from the memory 13 to be aligned with frame synchronisation information. A digital linear keyer 16 allows the data output from the memory 13 (which is representative of foreground information) to be keyed into the background (represented by a signal B input to keyer 16) for forming the output video $V_2$ of the output picture $P_2$. A key processor 22 controls the operation of the digital linear keyer 16. The digital video effects unit 10 is under the control of the control unit 24 which can, but need not, be implemented as a conventional personal computer or a computer workstation with appropriate control software.

A known example of a digital video effects system having the above architecture can perform 3D linear manipulations of high definition video with a very high video output quality. However, the known system is limited to linear manipulations of video, being unsuitable for providing video texture mapping, or free form modeling onto a non-linear surface.

"Video texture mapping" is a term which derives from computer graphics where it is used to describe the mapping of an image onto a 3D surface. Originally this technique was developed for simulating surface texture, an appropriate image being mapped to give the desired effect. However, it has also been used for mapping other images to create other effects. See, for example, the colour plates in the book "Computer Graphics, Principles and Practice", Second Edition by Messrs Foley, Van Dam, Feiner and Hughes, published by Addison Wesley in 1990. In computer graphics applications, however, such video texture mapping is rarely, if ever, performed in real time.

In addition to providing video texture mapping, it is often desirable to provide lighting effects to enhance realism. A number of different techniques for providing lighting effects are known. Examples of techniques For providing lighting effects, including a technique known as the Phong technique, are described in Chapter 16 of the aforementioned book by Messrs Foley, Van Dam, Feiner and Hughes. The provision of lifting effects is conventionally one of the last stages in processing a graphics or video image. Such techniques can be implemented in applications employing ray tracing techniques. Although lighting models based on ray tracing techniques can produce outstanding results, they are extremely calculation intensive. To realise a real time lighting model based on ray tracing techniques would require a large amount of hardware.

SUMMARY OF THE INVENTION

An object of the present invention, therefore, is to provide a digital video effects system which enables the generation of lighting effects in an efficient and cost effective manner.

In accordance with the invention, there is provided a digital video effects system for mapping a source video image comprising an array of pixels onto an object surface to produce an output image, the system comprising a memory for temporarily storing an array of pixels derived from the source video image, control means for establishing a surface function defining the object surface, address means for computing read addresses for mapping pixels from the memory to form output pixels representative of the source video image mapped onto the object surface, characterised by write-side lighting effect means for modifying pixels from the source video image before writing to the memory.

In a system in accordance with the present invention, therefore, lighting processing is performed as a write-side process (i.e. it is performed on pixel values from the source video image before those values are stored in memory). Arranging for write-side processing in this manner enables lighting effects to be provided with a relatively small amount of hardware compared to that which would be required for read-side processing as part of a ray tracing technique.

Write-side lighting in accordance with the invention can be applied for digital effects systems which provide mapping of a source video image onto a non-linear object surface. However, the invention is not limited to such mapping for non-linear object surfaces, and can be applied to digital video effects system providing mapping onto linear surfaces.

Preferably, mapping means is provided for logically sectioning the source image into a plurality of tiles with the mapping means being responsive to the surface function for computing the mapping of tile corner coordinates onto the object surface. The lighting effect means preferably comprises a lighting effect processor which is responsive to lighting factors produced by a lighting factor generator. The lighting factor generator preferably comprises means for generating lighting factors for each pixel of each tile from mapped tile corner coordinate.

Preferably, the lighting factor generator is responsive to tile corner coordinates produced by the mapping means for generating a normal to each tile. The lighting factor generator preferably generates an interpolated normal for each pixel of the tiles from the surrounding tile normals.

Preferably, in addition, the lighting factor generator also computes pixel coordinates for the pixels of a tile as mapped onto the object surface by interpolation of the coordinates of the mapped tile corner points. The lighting factor generator preferably calculates an intensity multiplier for each pixel from the interpolated normal and coordinate of each pixel.

Preferably, the intensity multiplication factor is defined by the following relation:

$$LI = KdIa + \frac{KdId(N \cdot L)}{d + d\phi}$$

where

N.L represents the dot product of the tile normal and a lighting vector;

Id represents the intensity of a diffuse light source;

Ia represents the intensity of an ambient light source;

Kd represents a coefficient of reflection;

d represents a distance from a light source to a pixel; and d$\phi$ represents a constant.

By performing the lighting effect processing as a write-side process, it is possible to filter the pixels modified by the lighting effect before storage in memory. Accordingly, therefore, the light effect means outputs pixels to a filter for filtering the pixels before storage in the memory, the filter applying variable filter characteristics in accordance with local scaling factors for the tiles to which the pixels belong. By filtering the pixels before storage, it is possible to mitigate the effects of aliasing which might otherwise be perceived as a result of lighting effects based on tiles.

Preferably, scale factor generating means responsive to the mapped tile corner coordinate values generated by the mapping means is provided for controlling the filter to perform appropriate filtering for respective tiles.

DESCRIPTION OF THE PREFERRED EMBODIMENTS

The example of an image processing system in accordance with the invention to be described herein enables a source video image to be mapped in real time onto a 3D non-linear surface through the use of a ray-tracing technique. Before this mapping can be performed, the object surface onto which the video image is to be mapped has to be defined. In the preferred embodiment of the invention, the object surface is defined in terms of the so-called "Bezier surfaces".

Before proceeding further with the description of an example of a digital video effects system in accordance with the invention, there follows a brief introduction to the concepts of Bezier curves and surfaces. This method for constructing curves and surfaces was developed by a French engineer, Bezier, for use in the design of car bodies. A Bezier curve is a two-dimensional curve constructed by forming a polynomial function from a set of control points.

Figure 1:
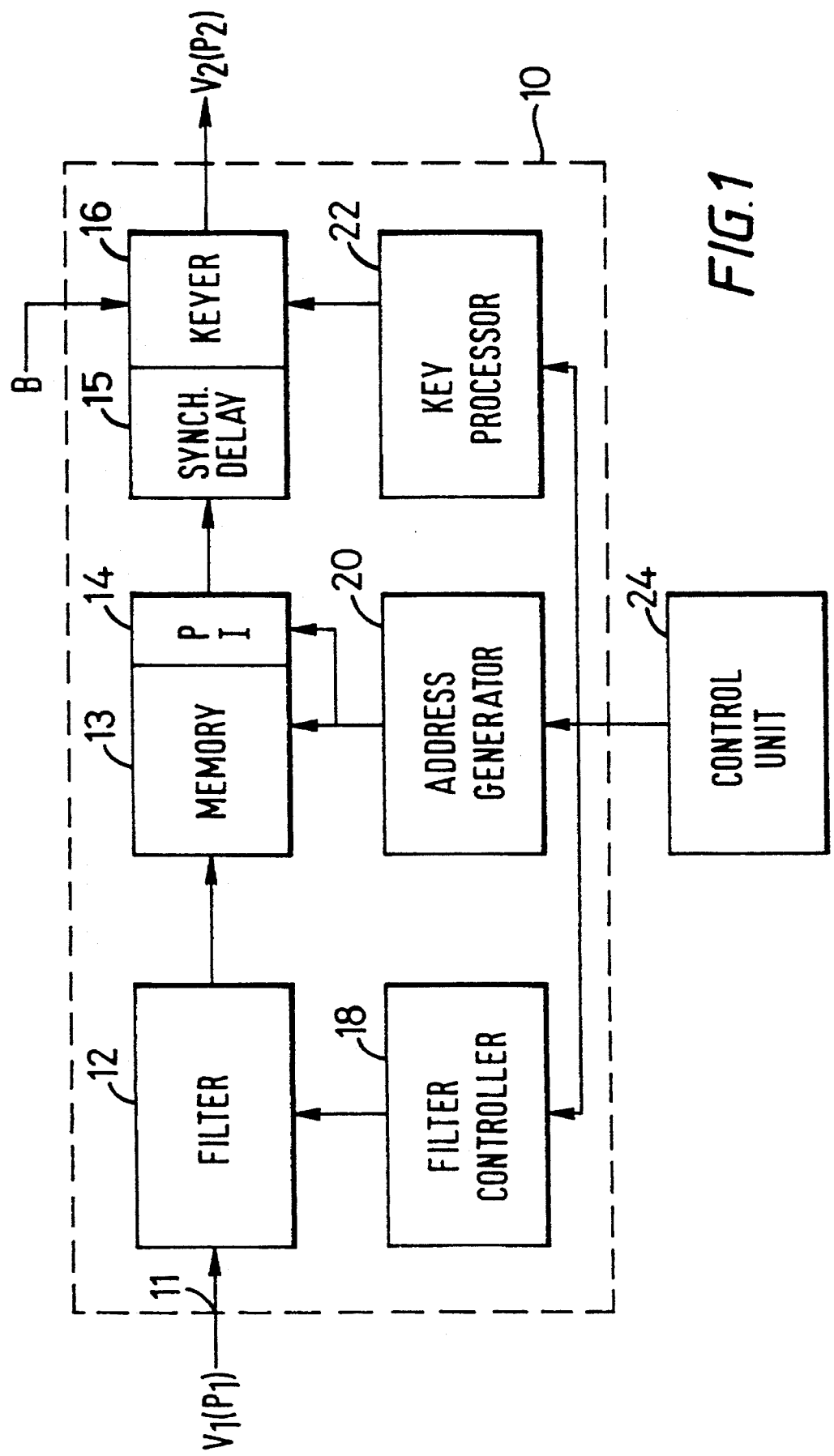
FIG. 1 is a schematic block diagram of a typical digital video effects system.
Figure 2:
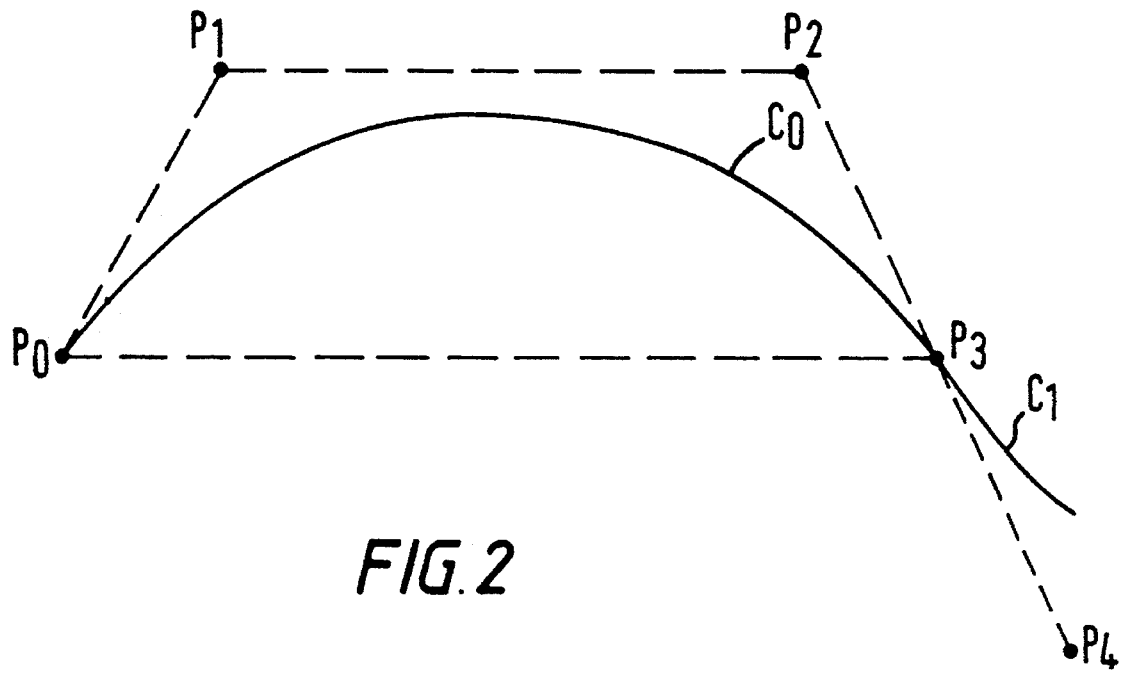
FIG. 2 is an illustration of a Bezier curve.

FIG. 2 illustrates a Bezier curve $C_O$ which is defined by 4 control points $P_0$, $P_1$, $P_2$ and $P_3$. From these co-ordinate points, there can be calculated a Bezier co-ordinate function P(u) representing the three parametric equations for the curve which fits the input control points $P_k$, where $P_k=(x_k, y_k, z_k)$, for k=0, 1, 2, 3. This Bezier coordinate function can be calculated as:

$$P(u) = \sum_{k=o}^{n} p_k B_{k,n}(u) \quad (1)$$

where u is the distance along the curve from P0 (u=0) to P3 (u=1); each $B_{k,n}$ (u) is a polynomial function called a "blending function" and defined as $$B_{k,n}(u) = C(n,k)u^k(1-u)^{n-k}; \quad (2)$$

and C(n,k) represent the binomial coefficients $$C(n,k) = \frac{n!}{k!(n-k)!} \quad (3)$$

An important property of any Bezier curve is that it lies within the convex hull defined by the control points. Another important property of Bezier curves is that the tangent to the curve at an end point is along the line joining that end control point to the adjacent control point. In order, therefore, to ensure continuity between a first Bezier curve and a second Bezier curve at an end point it is merely necessary to ensure that the common end point of the two curves and the respective adjacent control points all lie on a straight line. This is illustrated in FIG. 2 for the curves $C_0$ and $C_1$ and control points $P_2$, $P_3$, $P_4$.

Figure 3:
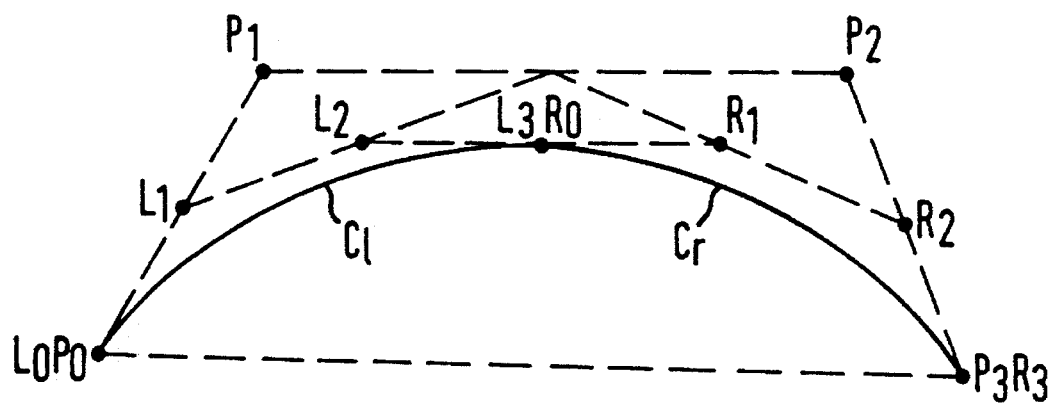
FIG. 3 shows the division of a Bezier curve.

Another feature of Bezier curves is the way in which it is possible to subdivide a Bezier curve to generate two Bezier curves. FIG. 3 illustrates the generation of the control points for Bezier curves $C_l$ and $C_r$, being Bezier curves formed by subdividing, by two, the Bezier curve $C_0$. The control points for the left hand curve $C_l$ are $L_0$, $L_1$, $L_2$ and $L_3$. The control points for the right hand curve $C_r$ are $R_0$, $R_1$, $R_2$ and $R_3$. It can be seen by examination of FIG. 3 that these control points can be determined by the following equations:

| | |
|---|---|
| $L_0 = P_0$ | $R_3 = P_3$ |
| $L_1 = (P_1 + L_0)/2$ | $R_2 = (R_3 + P_2)/2$ |
| $L_2 = ((P_2 + P_1)/2) + L_1)/2$ | $R_1 = ((P_2 + P_1)/2 + R_2)/2$ |
| $L_3 = (L_2 + R_1)/2$ | $R_0 = L_3$ |

It will be noted that the two new Bezier curves can be generated from the original Bezier curve by simple additions and divisions by two. In a binary system, therefore, the new Bezier curves can be generated by a simple combination of additions and shift operations.

Figure 4A:
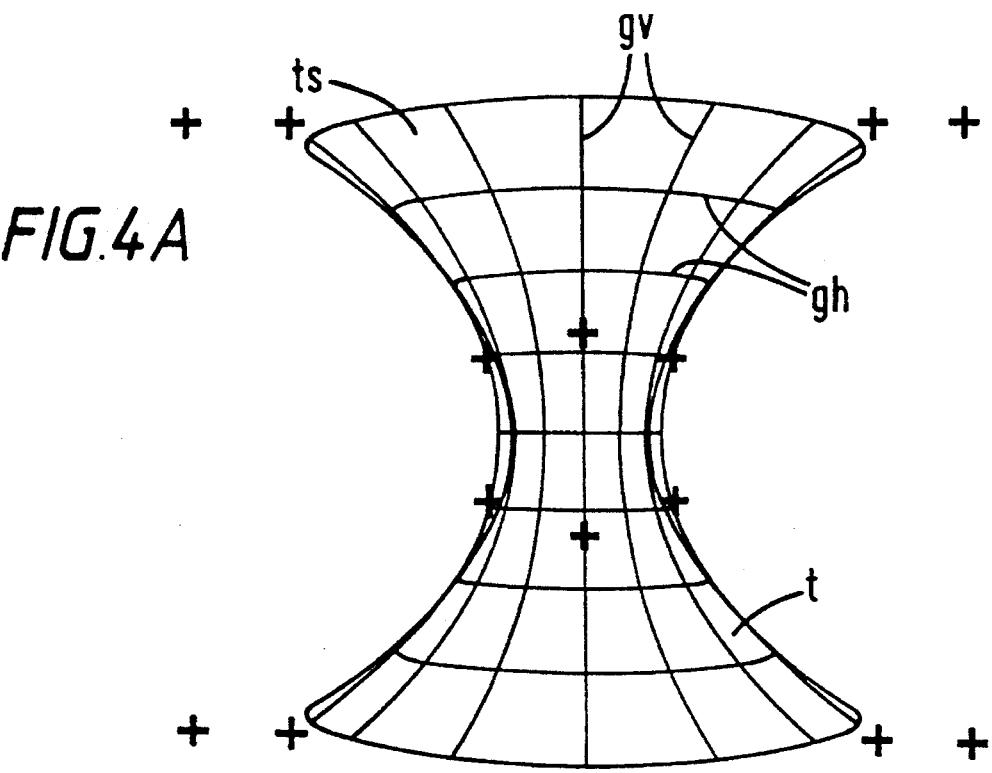
FIG. 4A is an illustration of a Bezier surface.

A Bezier surface is defined by two sets of Bezier curves specified by appropriate input control points. FIG. 4A shows a surface generated using this method with respect to control points represented by the small plus signs. The generally horizontal, gh, and generally vertical, gv, line segments in FIG. 4A describe lines of constant latitude and longitude (u and v) over the surface for respective polynomials $$P(u) = \sum_{k=o}^{n} P_k B_{k,n}(u) \quad (4)$$

and $$P(v) = \sum_{k=o}^{n} P_k B_{k,n}(v).$$

For further information regarding Bezier curves and Bezier surfaces, the reader's attention is directed to Chapter 11 of the book entitled "Computer Graphics, Principles and Practice", Second Edition by Messrs Foley, van Dam, Feiner and Hughes, published by Addison Wesley in 1990.

Figure 5:
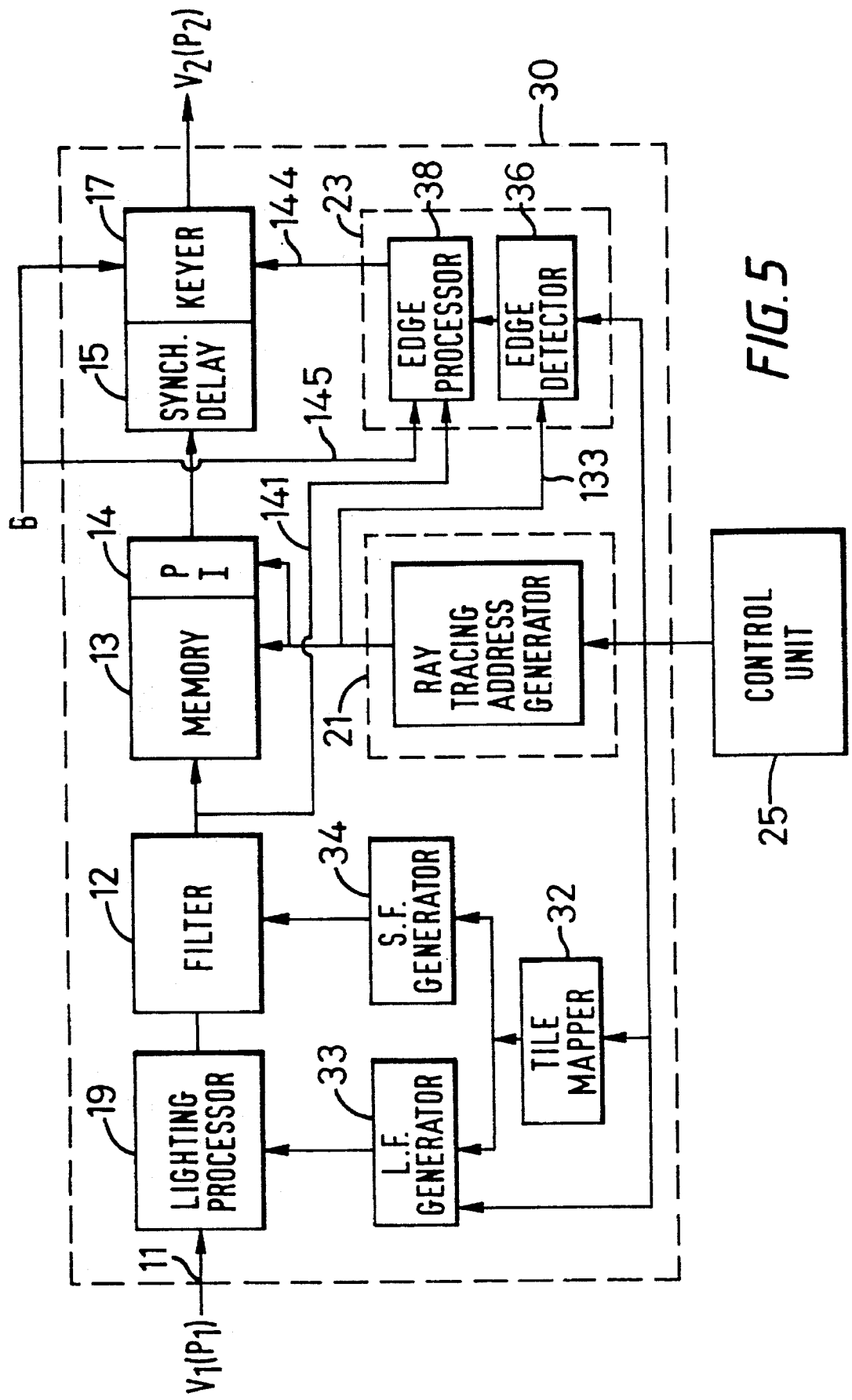
FIG. 5F is a schematic block diagram of an example of a digital video effects system in accordance with the invention.

FIG. 5 shows, in simplified block diagram form, an image processing system in accordance with the invention. A digital video effects unit 30 includes a video path similar to that in the prior art including a source image input 11, a filter 12, a memory 13 with a pixel interpolator 14, a synchronisation delay circuitry 15 and a digital keyer 17. In addition, the digital video effects unit 30 includes a lighting processor 19 which is arranged before the filter 12 and the memory 13 in the image processing path. In other words, the lighting processing is arranged as a write-side process with respect to the memory 13. The digital video effects unit 30 is under the control of a workstation 25. The workstation 25 is provided with software for defining an object onto which a source video image is to be mapped in terms of Bezier surface functions. The output of the workstation includes sets of co-ordinates for the Bezier control points for those surfaces (eg. the points $P_0$, $P_1$, $P_2$ and $P_3$ shown in FIG. 2). For controlling the operation of the lighting processor 19, a lighting factor (L.F) generator 33 is provided. A scale factor (S.F) generator 34 controls the operation of the filter 12. The L.F and S.F generators are both responsive to a tile mapper 32. The tile mapper 32, and an address generator 21 and a key processor 23 for controlling the memory 13 and the keyer 17, respectively are specifically adapted to respond to Bezier control point data from the workstation 25 and will be explained in more detail hereinbelow. In general terms, the tile mapper 32, the address generator 21 and the key processor 23 use the control points to control, respectively, the write side processing of the received images, the read-side addressing of the memory 13 and the operation of the keyer 17.

The write-side processing of the received video images is controlled by processing the source image space as a rectangle made up of tiles t (a tile is an area of the source image space constructed from a group of individual pixels P).

Figure 4B:
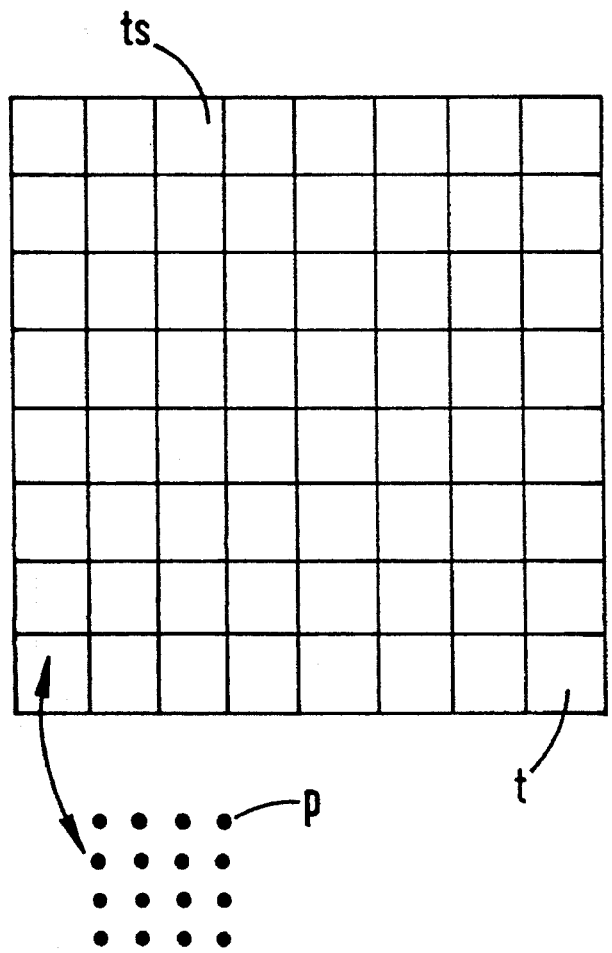
FIG. 4B illustrates tiling of the source image area.

FIG. 4B is a schematic representation of a simplified source image area, or space made up of an array of sub-areas in the form of 8×8 square tiles, t, each tile being made up of an array of 4×4 pixels, P. In practice, the tiles need not be square, and could be larger. Certainly, in a practical example, there will be many more tiles—eg, for a high definition television image there could be 550×281 tiles if each tile is 4×4 pixels in size of which 480×258 relate to the active picture. The mapping of these tiles onto the desired shape is computed from the Bezier surface of the target object, specifically from the Bezier control points output by the workstation 25 as will be described later. The generally horizontal and generally vertical lines of constant latitude and longitude of the Bezier surface illustrated in FIG. 4A could represent the mapping of the edges of the tiles of the source image space onto that surface. Note that there is a one-to-one mapping between each of the tiles of the source image space represented in FIG. 4B and the corresponding mapped tiles on the Bezier surface illustrated in FIG. 4A.

The purpose of the tile mapper 32 of FIG. 5 is to compute the mappings of the corners of the tiles for the input space onto the target object surface.

Figure 6:
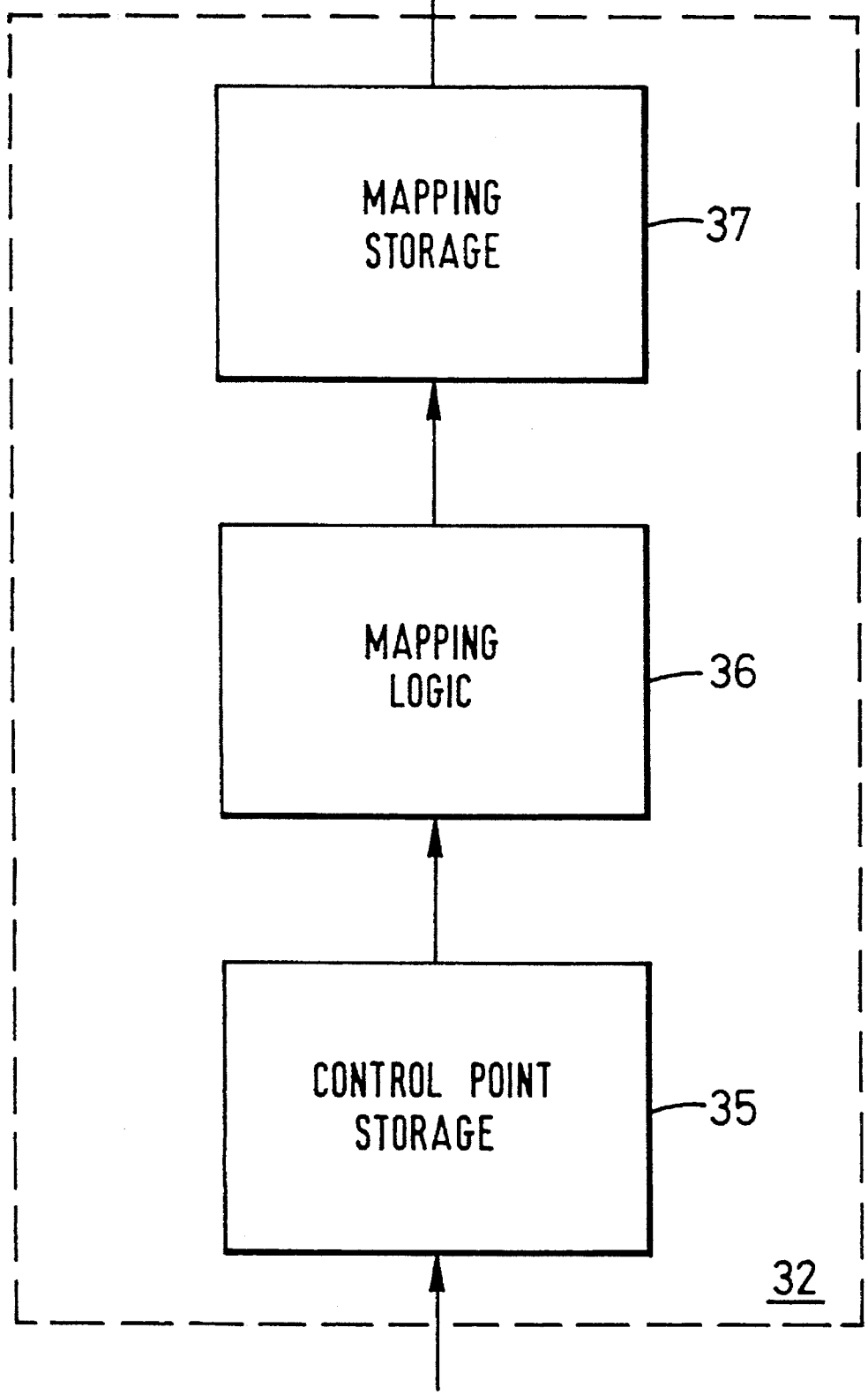
FIG. 6 is a block diagram of a tile mapper which forms part of the system illustrated in FIG. 5.

FIG. 6 is a schematic block diagram of the tile mapper 32, which includes control point storage 35, mapping logic 36 and mapping storage 37. The input to the tile mapper is in the form of an array of Bezier control points defining the target object, as output by the control unit 25. These control points are stored in control point storage 35.

Note, that in general, the target object will be defined in terms of a plurality of surface patches, each patch being itself defined in a Bezier surface function in terms of the control points for a constituent set of Bezier curve functions. However, for ease of explanation, it will be assumed in the following example that the target object comprises a single patch defined in terms of a single set of sixteen control points.

Figure 7:
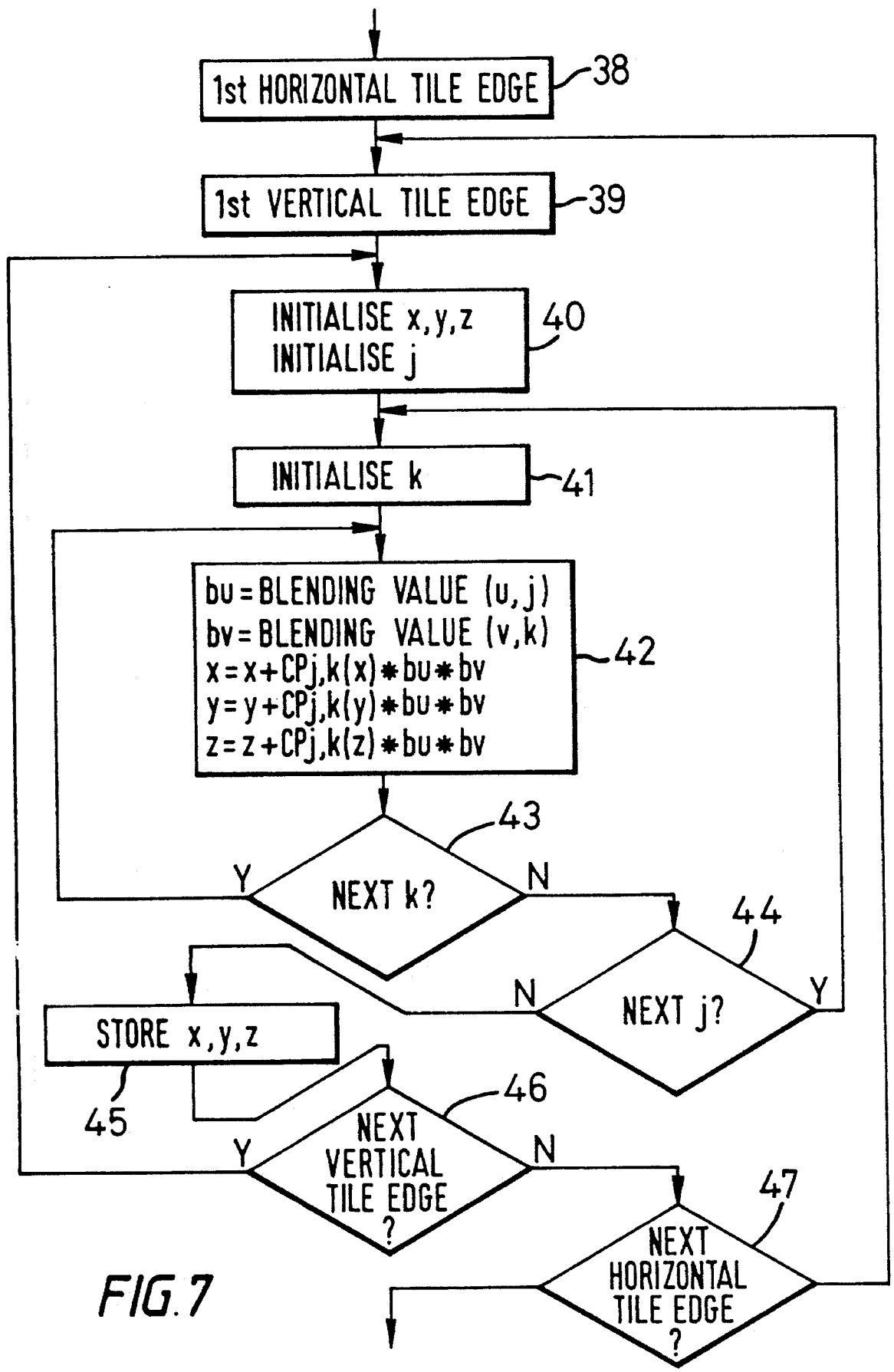
FIG. 7 is a flow diagram describing the operation of mapping logic in the tile mapper of FIG. 6.

Once the control points have been stored in the control point storage, the mapping logic 36 then determines, for each tile corner point in the tiled source image space, the mapping of that point into mapped space. In performing this processing, the mapping logic accesses the control points in the control point storage and stores the computed corner point mappings in the mapping storage 44. The mapping logic 42 processes each tile corner point in turn, computing For that corner point a mapped coordinate value. The processing of the mapping logic 42 is summarised in FIG. 7.

The mapping logic processes the tiles row-by-row, and within each row, column-by-column. In order that a mapped coordinate value for each of the corners of the tiles is generated, the mapping logic starts at step 38 with treating the First, i.e. the top, horizontal edge of the top row of tiles, and selects, at step 39, the first vertical tile edge (i.e. the left hand tile edge). This means that by step 40, the mapping logic has selected the top left hand corner of the image. At step 40, the mapping logic initialized variables x, y and z For accumulating the mapping for the point currently in question (i.e. initially the top left hand corner of the image).

The mapping logic computes the mapping for the point in question by considering each control point in turn. The control points are stored in the memory as a two dimensional array of control points; the mapping logic 36 accessing this array of control points using variables j and k. Thus, at step 40 the mapping logic initializes the variable j. At step 41 the mapping logic initializes the variable k. At step 42, for given values of j and k, the mapping logic evaluates the horizontal blending function for u and j to generate a horizontal blending value bu, and evaluates the vertical blending function for v and k to generate a vertical blending value, bv.

Then, the mapping logic updates the currently accumulated x, y and z values for the tile corner point in question. The new value for the x coordinate is computed by adding to the previous value of the variable x, the x coordinate value of the control point identified by the variables j, k multiplied by the horizontal blending value bu and the vertical blending value bv. Similarly, the new value for the variable y is computed by adding to the previous value of the variable y, the y coordinate of the control point identified by the variables j and k multiplied by the horizontal blending value bu and the vertical blending value bv. In the same way the new value of the variable z is computed by adding to the previous value of the variable z, the z coordinate of the control point identified by the variables j and k multiplied by the horizontal blending value bu and the vertical blending value bv. By incrementing the k values until all values of k have been considered (step 43) and by incrementing the j values until all j values have been considered (step 44) the contribution of the coordinate values of each control point can be accumulated. At step 45, when the respective coordinate values for each of the control points has been considered for the current tile corner point in question the x, y and z values for that tile corner point can be stored in the mapping storage 37.

At step 46 the mapping logic determines whether there is another tile edge to be considered and if so the mapping logic determines the v value for this next tile edge and returns control to step 40 where the values for x, y and z are re-initialised for generating the mapping for this new point. The mapping logic continues to step along a line of tiles until the right hand edge of the last tile has been considered. When the right hand edge of the current line of tile corner points has been considered the mapping logic then proceeds at step 47 to test whether there is another horizontal tile edge to be processed. If there is, the u value is updated accordingly and the next tile edge is considered. All of the vertical edges, including the top and the bottom edges will be processed so that mappings are generated for each corner point of the tiles of the source image space.

Thus, from the control points for the Bezier surface function output by the workstation 25, the mappings of corner points of the tiles are determined. The mapped coordinates of the corner points of the tiles are used by the lighting factor generator 33 to generate lighting factors for controlling the lighting processor 19. Also, the differences between the original and mapped corner points for the tiles are used by the scaling factor generator 34 to determine local scaling factors for each of the tiles, which in turn are used to control the filter 12 for applying a degree of filtering to each tile of the source image appropriate to the compression effective for that tile as a result of the mapping.

The generation of lighting effects by the lighting factor generator 33 and the lighting processor 19 will now be described. The lighting factor generator 33 utilizes the tile corner point generated by the tile mapper 32.

Figure 8A:
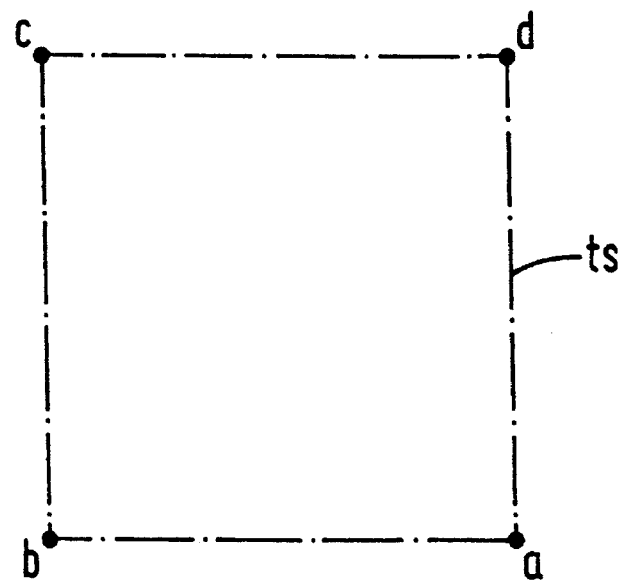
FIG. 8A illustrates a tile selected from FIG. 4B
Figure 8B:
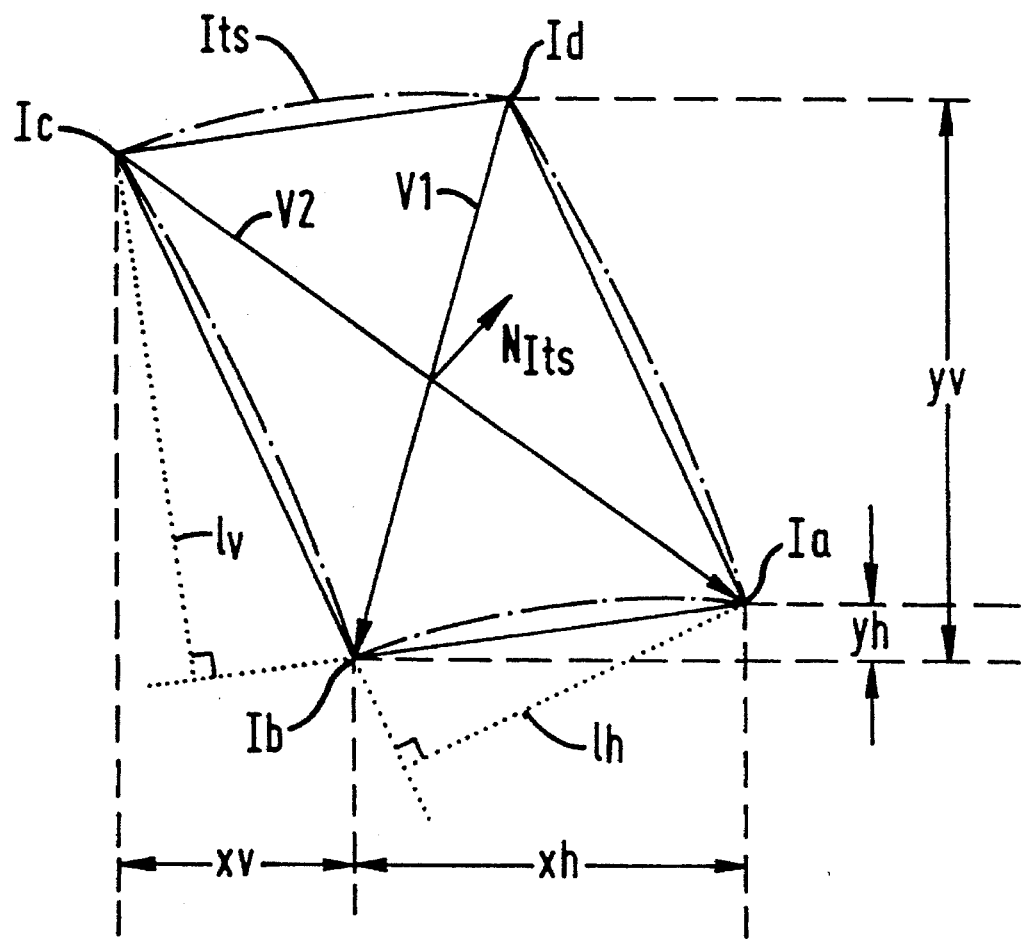
FIG. 8B shows the corresponding tile on the Bezier surface of FIG. 4A.

FIG. 8A shows a local area (specifically the tile labelled "ts" in FIG. 4A) of the input image or picture, represented by the digital signal $V_1$, prior to manipulation by mapping. As illustrated, prior to manipulation, the tile ts is square. The tile has corners a, b, c and d. Its edges c-d and b-a horizontal and its edges c-b and d-a are vertical. FIG. 8B shows the tile ts of FIG. 8A after manipulation as "Its". The positions of the corners a, b, c and d after manipulation, that is their positions in the manipulated image, are represented in FIG. 8B as Ia, Ib, Ic and Id, respectively. FIG. 8B a normal vector $N_{Its}$ to the mapped tile. The normal $N_{Its}$ is defined as also illustrates two vectors V1 and V2 defined with respect to pairs of corner points (Ib–Id and Ia–Ic), respectively, of the mapped tile and a normal vector $N_{Its}$ to the mapped tile. The normal $N_{Its}$ is defined as the dot product of the vectors V1 and V2.

The write-side lighting processing of the present example of the invention uses the tile corner points to calculate a normal to each tile. By interpolation of the normals to each tile it is then possible to determine a normal vector for a mapping of each pixel by interpolation and to calculate lighting factors using the dot product of the calculated normals for the pixels and a lighting vector. Before describing the lighting factor generator 33 and the lighting processor 19 in more detail, there follows a brief summary of Phong lighting techniques.

Figure 9A:
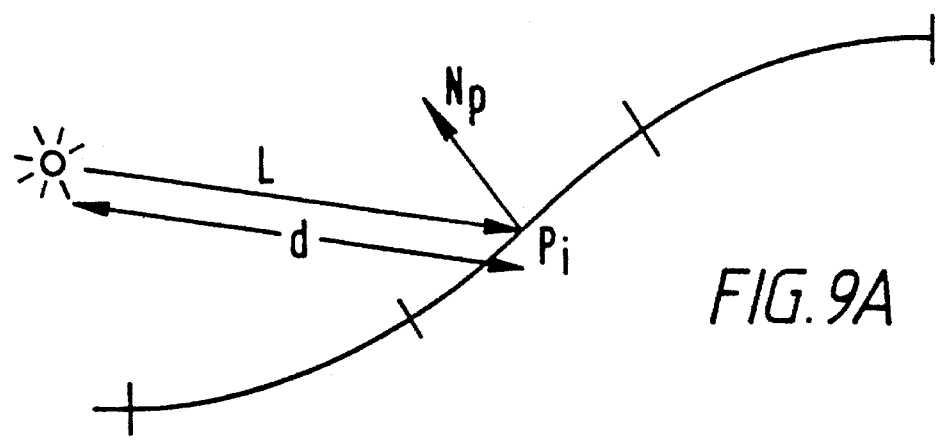
FIG. 9A is a diagram illustrating a Phong lighting technique.

The basic Phong lighting technique is illustrating schematically in FIG. 9A. $N_P$ represents a normal to a pixel on the surface of the object in question. L represents a lighting vector. d represents the distance of the light source from the pixel. If these characteristics are known, then a light intensity can be calculated using the following well known equation:

$$Ll = KdIa + \frac{KdId(N \cdot L)}{d + d\theta} \quad (5)$$

In the above equation:

N.L represents the dot product of the surface normal at the point in question (i.e. the normal to the mapped pixel) and the lighting vector L;

Id represents an intensity of a diffuse light source;

Ia represents an intensity of an ambient light source;

Kd represents a coefficient of reflection of the surface;

d is the distance from the light source to the pixel;

and $d\theta$ represents a constant to prevent the denominator of the equation from approaching zero.

For any one image, the values Id, Ia, Kd and $d\theta$ and the lighting vector L will be constant. However, new values for the normal to the pixel N and for the distance from the light source to the pixel will need to be calculated for each pixel of the image.

Figure 9B:
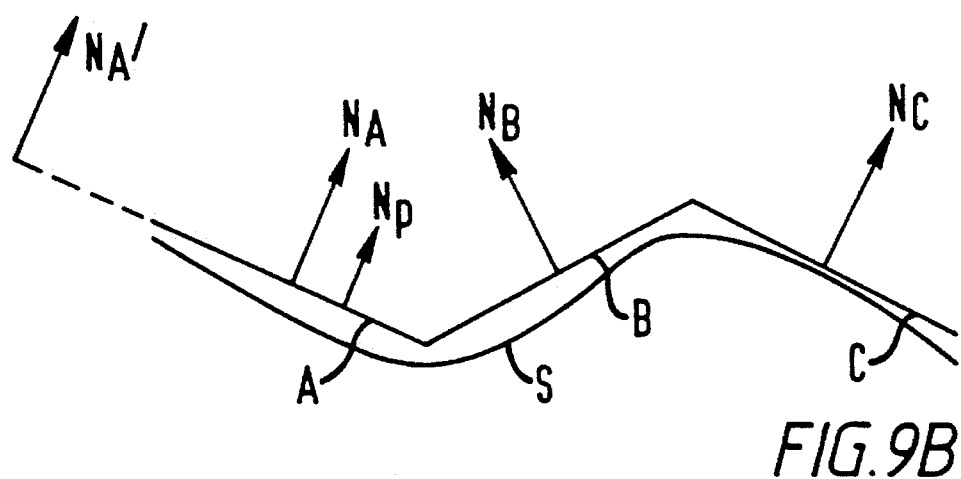
FIG. 9B is a diagram of a two-dimensional example of the generation of normals.
Figure 9C:
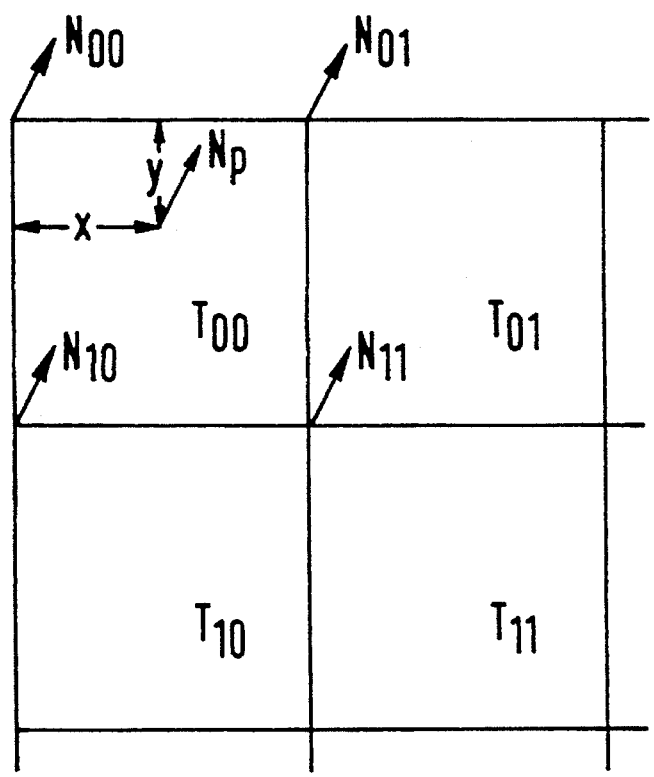
FIG. 9C is a diagram of a three-dimensional example of the generation of normals.

The lighting factor generator 33 performs the calculation indicated by the above equation for the light intensity by calculating normals for each of the tiles from the corner points of those tiles and then interpolating between those normals to generate normals for each of the individual pixels. FIG. 9B represents this process in schematic terms for two dimensions, where S is the surface of the object in question, where $N_A$, $N_B$ and $N_C$ represent normals to each of tiles A, B and C, respectively. $N_P$ represents a normal to a particular pixel from the tile which is computed by interpolation of the adjacent tile normals. FIG. 9B represents the normals $N_A$, $N_B$ and $N_C$ at the centre of the respective tiles. However, in such a situation, if the left hand edge of the tile A is the edge of the image, it can be seen that no normal is provided to the left of the normal NA for interpolating the pixel normals to the left of that vector. One possible solution to this problem would be to extrapolate the tile A to generate an imaginary normal $N'_A$. This could then be used for interpolating pixel normals to the left of the tile normal $N_A$. However, in the preferred embodiment of the invention, an approach illustrated in FIG. 9C is employed. FIG. 9C is a three dimensional representation of the tiles of the input image. The normal for tile $T_{00}$, $T_{01}$, $T_{10}$, $T_{11}$ and so on, that is normals $N_{00}$, $N_{01}$, $N_{10}$, $N_{11}$, and so on, are defined at the top left corner of the corresponding tiles. In this way, the normals $N_P$ for each of the pixels P in each tile can be calculated by the normals at the four corners of that tile. Thus, for example, the normals $N_P$ for each of the pixels in the top left hand tile can be computed by interpolating the values of the surrounding four normals $N_{00}$, $N_{01}$, N10 and $N_{11}$. The interpolation is performed in a linear manner using the displacements y and x from the top and left hand edges of the tile in question. In order that the pixels of the bottom row of tiles and the right hand row of tiles for the active picture area of the input image can be calculated, normals are calculated for tiles which extend to the bottom and the right of the input video area (i.e. to the bottom and the right of the array of tiles ts shown in FIG. 4B). The additional tiles to the right and the bottom are not shown in FIG. 4B. However, in this manner, a tile normal is generated for each corner of each of the tiles in the array of tiles shown in FIG. 4B. These normals defined at the corners can then be used to compute a normal for each of the pixels within each of the tiles t shown in FIG.

The determination of the normals at a particular point can be performed by linear interpolation of the adjacent tile normals. Generally, for a two dimensional case such as illustrated in FIG. 9B, an interpolated normal $N_{int}$ can be determined by the following equation:

$$N_{int} = \alpha N_{left} + (1-\alpha) N_{right} \quad (6)$$

where $n_{left}$ is the normal to the left of the required space; $N_{right}$ is the normal to the right of the required space; and $\alpha$ is the coefficient of interpolation. In a three dimensional case as illustrated schematically in FIG. 9C and implemented in the present invention, two dimensional interpolation is performed. Thus, an interpolated normal, say a normal $N_P$ in a tile $T_{00}$ is defined by the following equation:

$$N_P = y(xN_{00} + (1-x)N_{01}) + (1-y)(xN_{10} + (1-x)N_{11}) \quad (7)$$

A normal $N_P$ computed in this way can then be used as the normal N in the equation for light intensity mentioned above to form the dot product with the light vector L.

The distance d from the light to the pixel also needs to be calculated for each pixel. This can also be calculated by interpolation from the coordinates of the mapping tile corner points which are output by the mapping logic 32.

The distance, d for any given pixel can then be computed by the following equation:

$$d = \sqrt{((p_x - l_x)^2 + (p_y - l_y)^2 + (p_z - l_z)^2)} \quad (8)$$

or, where d is expected to be large by the following equation:

$$d = |p_x - l_x| + |p_y - l_y| + |p_z - l_z| \quad (9)$$

Where $P_x$, $P_y$ and $p_z$ are the interpolated mapped coordinates of the pixel in question and $l_x$, $l_y$ and $l_z$ are the coordinates of the light source.

Figure 10:
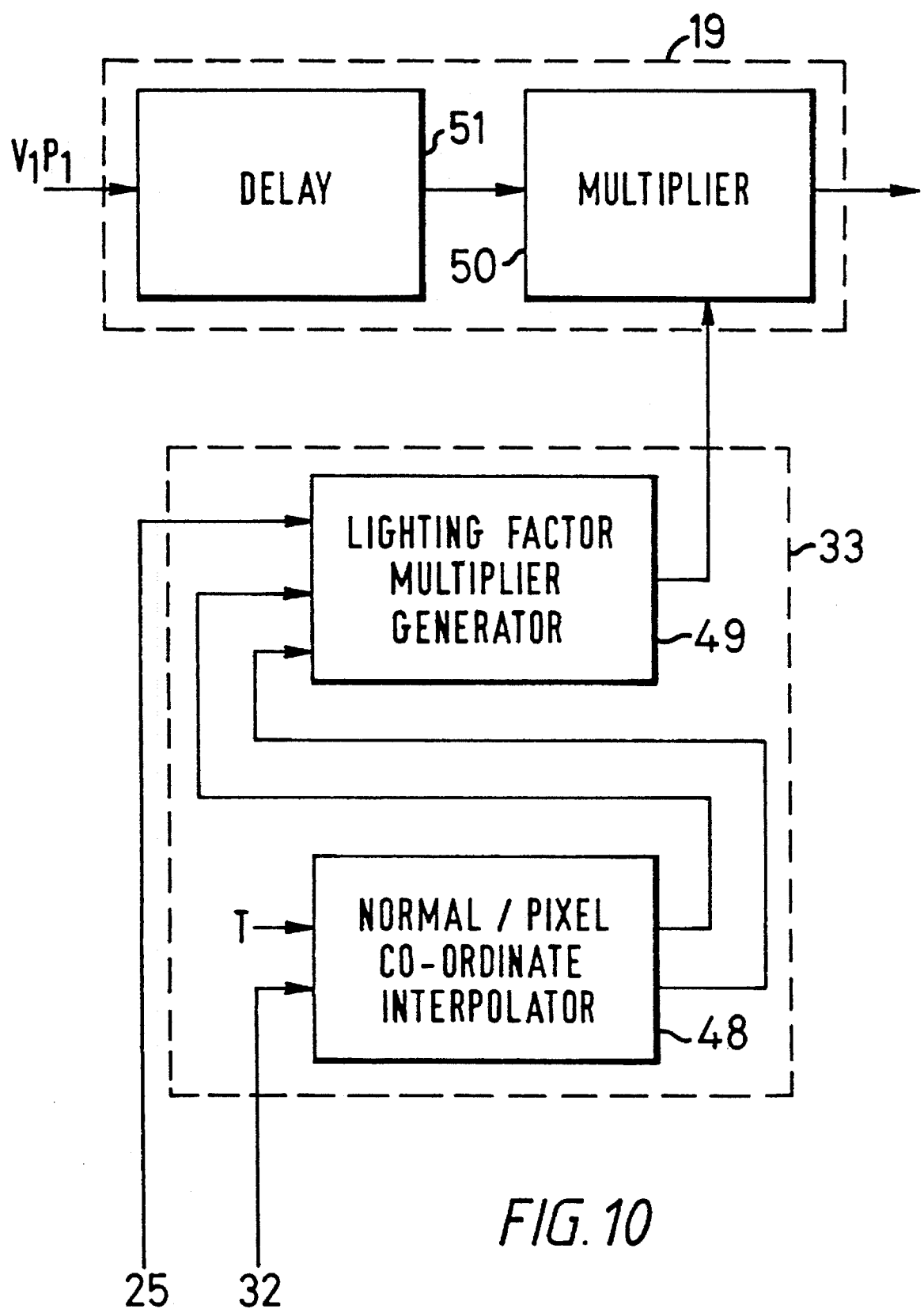
FIG. 10 is a schematic block diagram of a lighting processor and a lighting factor generator of the system of FIG. 5.

FIG. 10 is a schematic block diagram illustrating, in more detail, the lighting factor generator 33 and the lighting processor 19. The lighting factor generator 33 comprises a normal/distance interpolator 48 and a lighting factor multiplier generator 49. The lighting processor 19 comprises a pixel multiplier 50 and a delay stage 51.

Figure 11A:
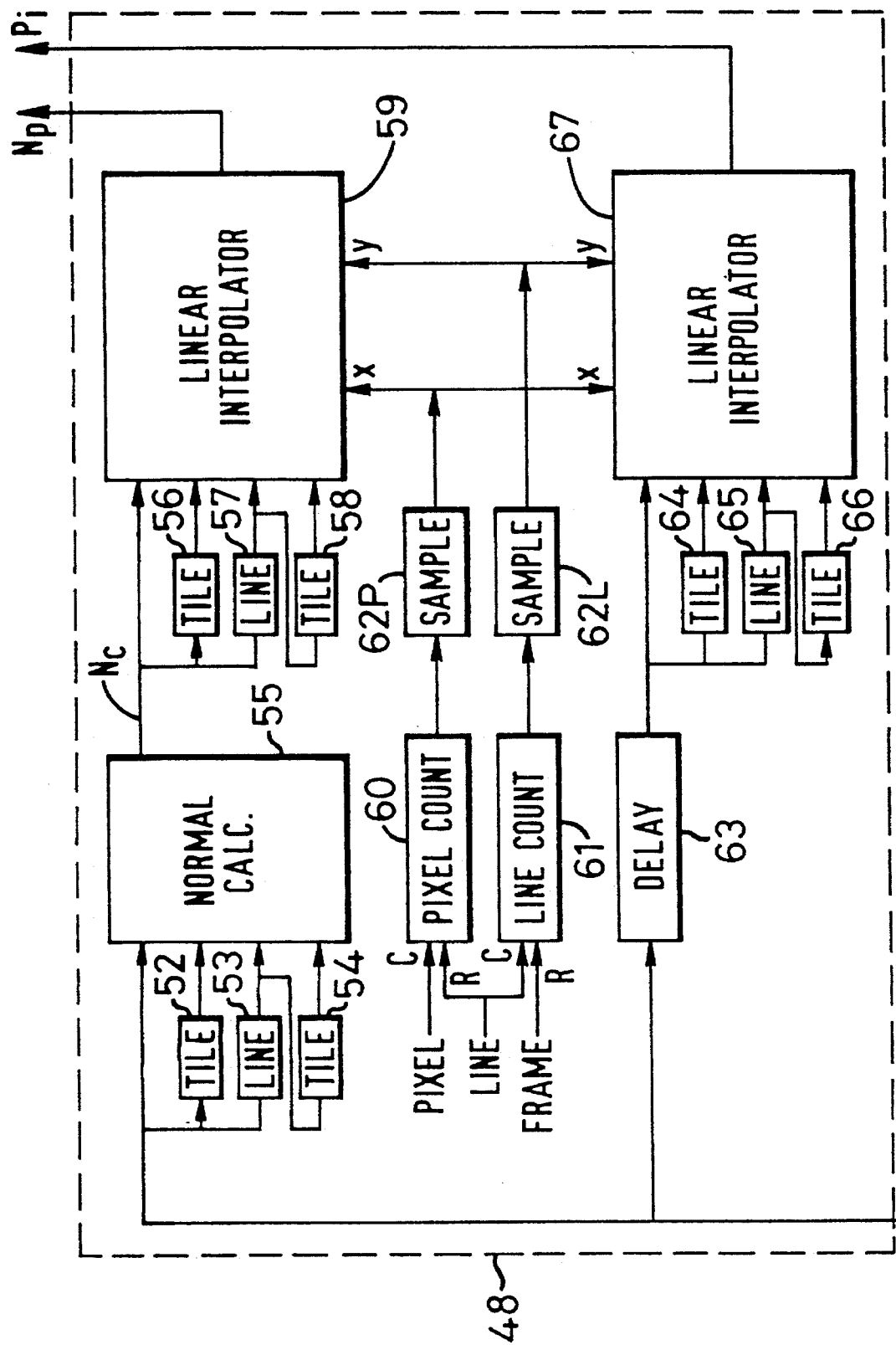
FIGS. 11A and 11B are schematic block diagrams of an interpolator and lighting factor multiplier generator of the lighting factor generator of FIG. 10.

FIG. 11A is a schematic block diagram of the normal/pixel interpolator. The normal/pixel interpolator receives the tile corner coordinate from the tile mapper 32 and timing signals coordinated with the pixels of an input image. In practice, due to the calculations performed, the tile coordinates need to be provided to the normal/pixel interpolator in advance of the pixels to which the interpolated values relate due to the manner of calculation of the interpolated normals and the interpolated pixel coordinates of the mapped pixels. In particular, the mapped tile corner coordinates are input to a normal calculation circuit 55 which forms the normal for each tile by forming the dot product of the vectors joining the opposite corner points of each tile as illustrated schematically in FIG. 8B. The tile coordinates are supplied row by row and within each row corner by corner. The rate at which the tile corner coordinates are supplied depends on the number of pixels per tile. If, therefore, in the example shown in FIG. 4B there are 16 pixels per tile, then a set of tile corner coordinates will be provided at one quarter of the pixel rate. The tile corner coordinate for each tile can be supplied simultaneously to the normal calculation circuit 55 by supplying a current tile coordinate (e.g. $N_{11}$) directly to the normal calculation, a second tile coordinate (e.g. $N_{10}$) with a one tile delay by means of a one tile delay means 52, a third pixel (e.g. $N_{01}$) with a one line delay by means of a one line delay line 53 and a fourth pixel with a one line and one tile delay by means of the one line delay means 53 and the one tile delay means 54. The normal calculation circuit 55 generates the normal by computing the dot product of the vectors joining the diagonally opposite mapped tile corner point.

This normal $N_c$ is then supplied to a linear interpolator 59. In order to compute the position of the pixels within a particular tile (e.g. tile $T_{00}$), it is necessary to already possess the normals for the four tile corner points of that tile. The tile corner points $N_c$ output by the normal calculation 55 are assumed to relate to the top left hand corner of the tile just calculated. Accordingly, a one line and one tile delay is necessary before all the corner points of a tile for which a normal has been calculated by the normal calculation unit 55 are available. Accordingly, a combination of means providing a one tile delay 56, a one line delay 57 and a further one tile delay 58 are provided in a similar manner to the delay units 52, 53 and 54 in order that the Four tile corner point normals for a particular tile can be input simultaneously into the linear interpolator 59.

The interpolation of the pixel normal for a pixel within the tile can then be calculated in accordance with the equation 7 above for the calculation of an interpolated normal $N_p$. The linear interpolator 59 performs this calculation in response to x and y values supplied thereto. The x and y values are calculated by counting pixels along each row using a pixel counter 60 and counting the lines of pixels by a line counter 61. The pixel counter is clocked by a pixel count signal and is reset by a line count signal. The line counter is clocked by a line count signal and reset by a frame count signal. Circuits 62p and 62l sample, respectively, the lower significant bits of the counts output by the pixel counter 60 and the line counter 61, respectively. Where, there are four pixels per tile, the circuits 62p and 62l sample the bottom two bits of the pixel and line counters whereby the values of x and y each cycle through zero, one, two, three in order to provide a linear interpolation of the normals input for the corner points of that tile. If another number of pixels where provided in each tile (e.g. 36), then the sampling circuits 62p and 62l would be arranged to sample the lower significant bits of the pixel count appropriately (e.g. modulo 6, whereby the values x and y would cycle between zero and five). The linear interpolator 59 outputs normals $N_p$ for respective pixels in response to the tile corner normals and the values of x and y input thereto in accordance with the equation for an interpolated normal $N_p$ referred to above.

The tile corner coordinates are also supplied to circuitry for interpolating the mapped coordinates of the pixels of a tile. The tile coordinates are supplied to a delay stage 63 which provides a delay equal to that resulting from the circuitry 52, 53, 54 and 55 in the normal calculation circuitry. The output of the delay circuitry 63 is then supplied to a linear interpolator 67. By a combination of delay means 64, 65 and 66 for providing a one tile delay, 64, a one line delay, 65, and a further one tile delay, 66 (compared the delay means 52, 53 and 54) the coordinates for the four mapped corners of a tile are supplied simultaneously to the linear interpolator 67. The linear interpolator 67 is responsive to the values of x and y output by the circuit 62p and 62l, respectively, to linearly interpolate the mapped corner points of the tile For generating mapped pixel coordinates for each pixel of the tile. The output pixel coordinates $P_i$ (x, y, z) are output from the normal/pixel interpolator 48 in synchronism with the corresponding normal $N_p$ for that pixel.

Figure 11B:
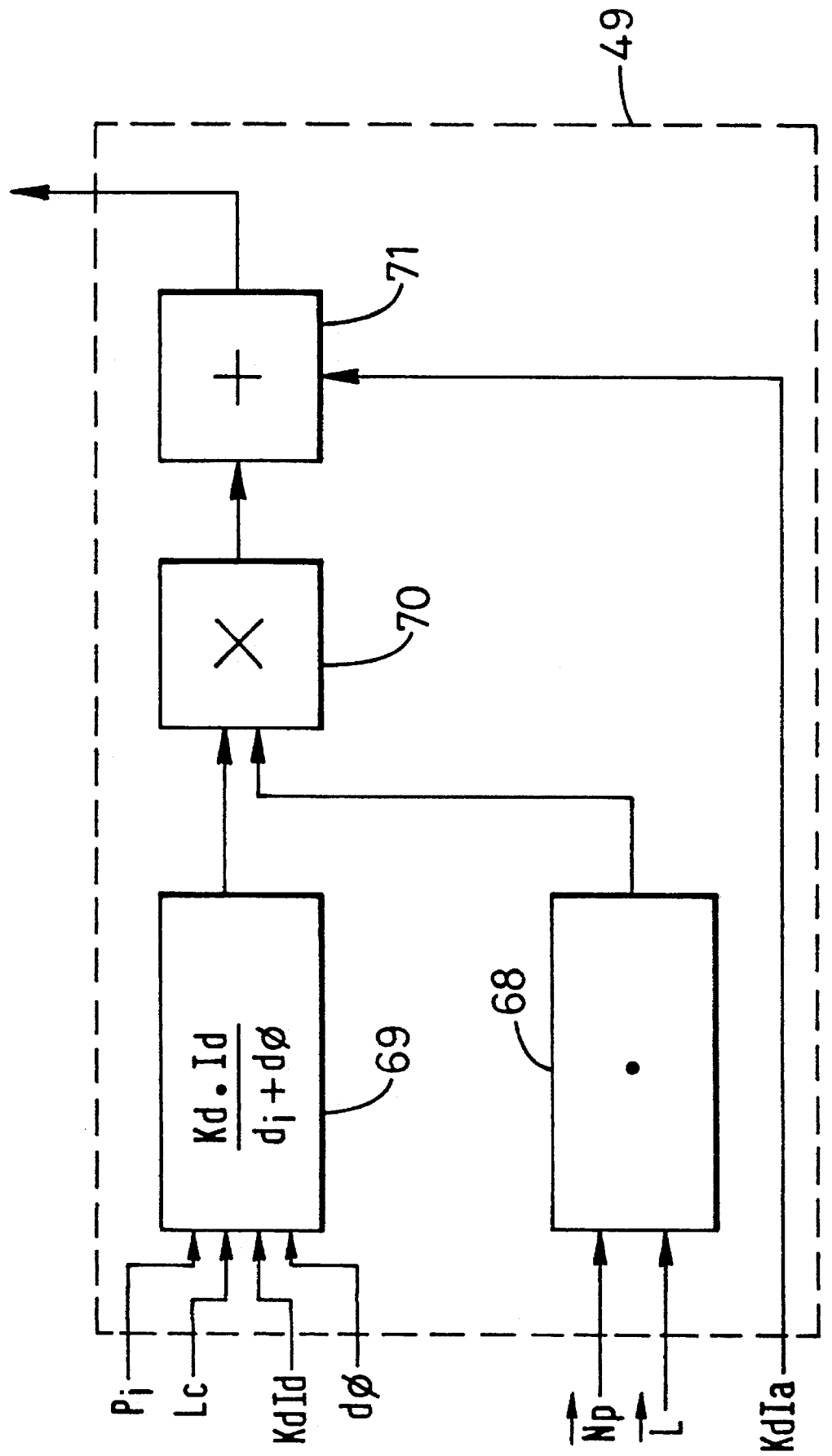

FIG. 11B is a schematic block diagram of the lighting factor multiplier circuit. The normal vector for a pixel $N_p$ is input to a circuit 68. The circuit 68 forms the dot product of the pixel normal $N_p$ and a lighting vector L supplied from the control unit 25.

The interpolated pixel coordinates $P_i$ (x, y, z) are input to means For calculating the relation $(Kd \times Id)/(di+d0)$. Accordingly, the circuit 69 also receives the coordinates of the light source L (x, y, z), the value of $(Kd \times Id)$ and $d0$. These values are provided from the control unit 25. The computation unit 69 then computes the relationship by computing the distance $d_i$ for the pixel in question from the coordinates of the interpolated pixel $P_i$ and the light source in accordance with the equations (8 or 9) for calculating d indicated above. Once the value of d has been computed the value of the relation $(Kd \times Id)/(di+d0)$ can be calculated. The output of the units 68 and 69 for a pixel are supplied simultaneously to a multiplier 70 and subsequently to an adder 71, where the value Kd Ia is added (the value Kd Ia being supplied from the control unit 25) in order to generate the light intensity multiplier which forms the lighting factor for the 25 current pixel. The lighting factor is used as a multiplier for multiplying the intensity of a received pixel in the pixel multiplier 50 of the pixel processor 19. The delay stage 51 in the received pixel line is arranged to delay received pixels by an appropriate amount such that the lighting factor for a pixel is output from the lighting factor generator 33 to the pixel multiplier 50 at the same time as the pixel concerned is supplied from the delay stage 51 to the pixel multiplier 50. The pixels with modified pixel intensity are output from the lighting processor 19 to the Filter 12.

The operation of the scale factor generator 34 and the filter 12 will now be described. The scale factor generator 34, which generates the scale factors for controlling the filter 12, uses the output of the tile mapper 32 in order to generate those scale factors.

The resulting shape of the manipulated tiles shown in FIG. 8B is assumed to generally approximate to a parallelogram as represented by the dashed lines in that FIG., so that local scaling factor generator such as are described in UK patent application GB 2244622 corresponding to U.S. Pat. No. 5,206,919 (Sony Corporation) may be used.

Figure 12:
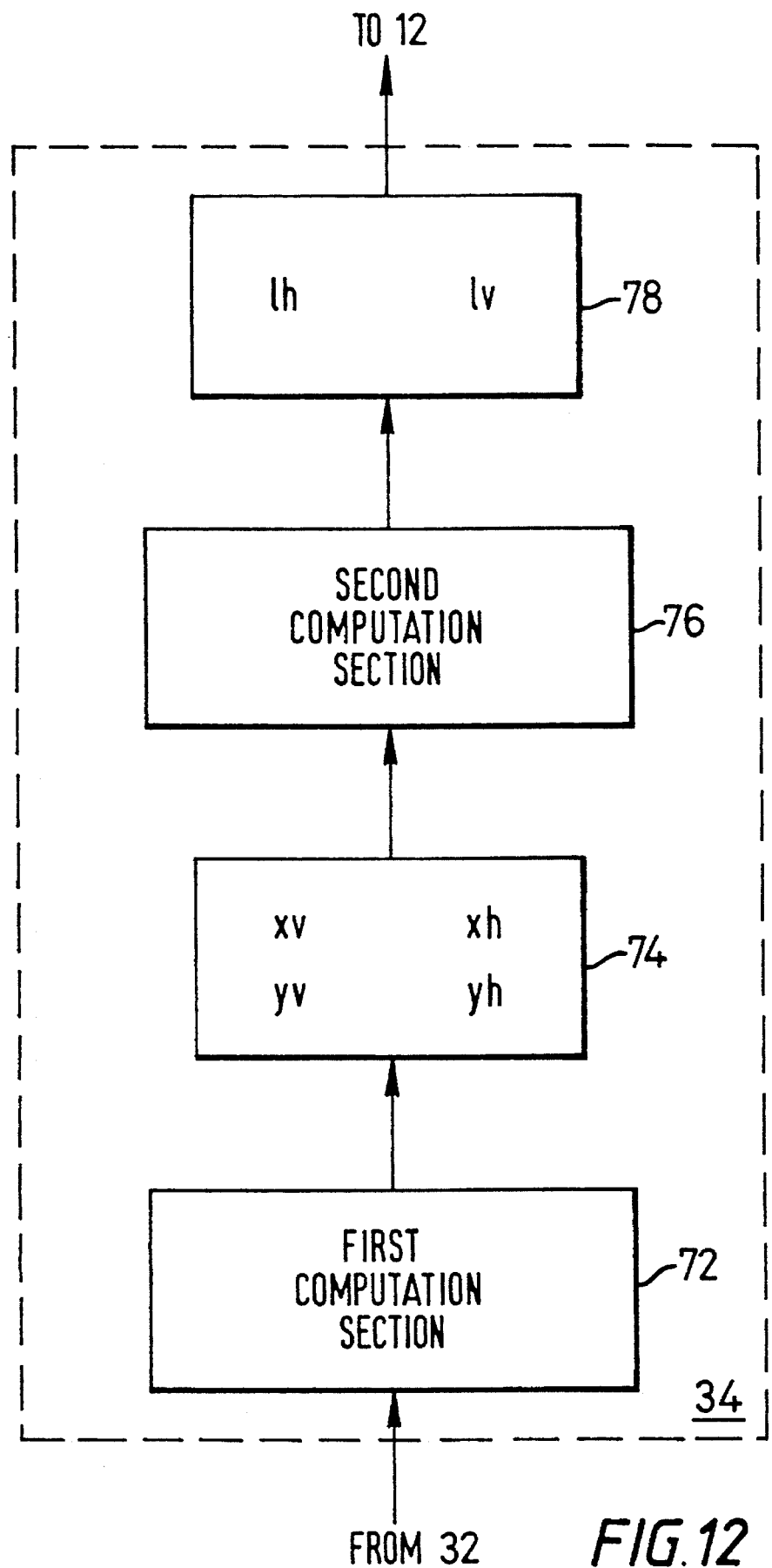
FIG. 12 is a schematic block diagram of a scaling factor generator which forms part of the system illustrated in FIG. 5.

FIG. 12 represents a local scaling factor computation means 34 which can compute a local horizontal scaling factor lh and a local vertical scaling factor iv for each tile of the source image where the tiles are mapped to form a quadrilateral which need only be generally in the shape of a parallelogram. A first computation section 72 computes values xv, xh, yv and yh from the coordinates of points Ia, Ib and Ic for each mapped tile, using the coordinates for those points stored in the mapping storage 44. These values, 74, are output to the second computation section 76. This second computation section computes the corresponding values of lh and lv using trigonometric relationships. The corresponding values of lh and lv, 78, are then output to the filter 12 in synchronism with the receipt of the image values to be filtered. The theory behind the generation of the lh and lv values by the local scaling factor computation means, will not be discussed in further detail herein, this being discussed fully in the aforementioned UK patent application number GB-A-2244622.

Figure 13:
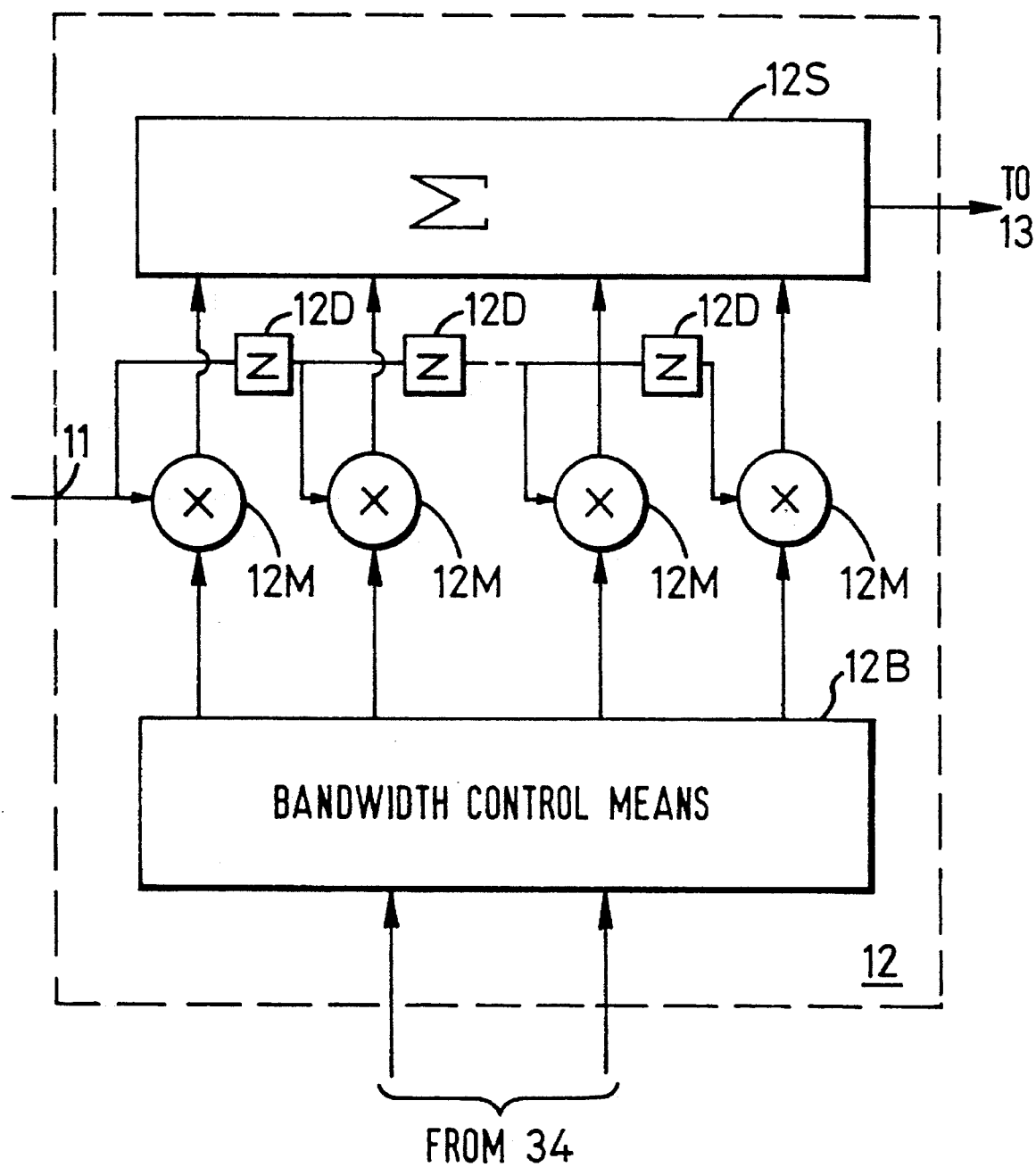
FIG. 13 is a block diagram of a filter which forms part of the system illustrated in FIG. 5.

The filter 12 is preferably a finite impulse response (FIR) filter. The design of 2D FIR filters is known per se and therefore the preferred form of filter will not be described in great detail herein. As is known to those skilled in the art, a 2D-FIR filter is operative during each clock period T (=1/FS), that is for each sample pixel, to calculate a filtered output word or sample by multiplying a predetermined set of vertically and horizontally spaced samples of the input signal by respective weighting coefficients and summing the products of the multiplication operations. To this end, a 2D FIR filter generally will comprise a plurality of multipliers supplied with respective weighting coefficients, a plurality of one sample delay elements and one line delay elements (line stores) arranged upstream or downstream or the multipliers to delay the samples of the input signal by different amounts to form the predetermined set or vertically and horizontally spaced samples, and a summing means to sum the delayed, weighted products. FIG. 13 is a schematic representation of a suitable filter in a rather general and simplified form, the filter 12 comprising a plurality of multipliers 12M, a plurality of delay elements 12D and a summing means 12S. Respective different weighting coefficients are supplied to the multipliers 12M on lines extending from a bandwidth control means 12B.

The bandwidth control means 12B is included in the filter 12 so that the values of the horizontal and vertical local scaling factors lh and iv can be used directly to compute appropriate values for the weighting coefficients to achieve a reduction in horizontal and vertical bandwidth of the filter 12. Preferably, a range of sets of weighting coefficient values appropriate to all possible values of lh and lv is computed at the design stage and the bandwidth control means 82 is implemented in the form of PROM that stores a look-up table of the pre-computed sets of weighting coefficient values. In this way the bandwidth control means can output appropriate values of the weighting coefficients to the multipliers 12M at each clock period in accordance with the values of lh and lv received from the local scaling factor computation means 34.

As explained above, the required reductions in horizontal and vertical bandwidths within a tile are related to the ratios of the horizontal and vertical dimensions and the amount of roll and shear of the manipulated tile compared to the unmanipulated image tile. These factors are taken into account in the design of the look-up table in the bandwidth control means 34, whereby the values lh and lv (rather than ratios computed therefrom) can be supplied directly to the bandwidth control means 34 as the horizontal and vertical local scaling factors.

The filtering of the source image signals is arranged to be performed in real time in synchronism with the receipt of the source image samples from the lighting processor 19; the filtered source image samples being stored in the memory 13.

In order to ensure that the scale factors are output from the scale factor generation means 34 at a correct timing, delay means (not shown) can be provided. The delay means can be inserted between the tile mapper 32 and the scale factor generation means 34, or between the scale factor generation means 34 and the filter 12. The required delay can be determined by one skilled in the art dependant on the specific circuit delays in any particular implementation. It can also be the case in specific implementations that no further delay is required between the tile mapper 32 and the filter 12, but alternatively that further delay means are required between the tile mapper 32 and the lighting processor 19. It is within the scope of the person skilled in the art provide appropriate timing of the signals fop controlling the lighting processor 19 and the filter 12.

The filtered image, when is-stored in the memory 13 in the received sequence, can then be mapped onto the target object by generating appropriate memory read addresses. The address generator 21 does this using a ray tracing sub-division technique known a Bezier subdivision. The technique used relies on the fact, mentioned earlier, that Bezier curves can easily be sub-divided into two curves by simple operations on the control points which only require additions and divisions by two.

The purpose of the address generator 21 is to generate address data defining the location of filtered source image data in the memory 15 which can be used to generate each pixel of the object image for subsequently forming the output image. The process is based on the concept of generating a Pay fop each object image pixel and detecting whether that Pay intersects the object, and if so to determine one or mope storage locations in the memory 13 containing source image data to be used to form the object pixel fop that Pay. To determine the intersection between the ray and the object surface, the technique involves, for each Pay, recursively sub-dividing the Bezier surface or patch into quadrants.

As mentioned earlier, in the case of a curve, the control points can be used to define a convex hull which completely contains the curve. The same applies to a Bezier surface, where the control points can be used to define a convex volume with polygonal sides, completely containing the surface. For ease of calculation, rather than considering the convex hull, the address generator uses a simpler "bounding box" based on the maximum and minimum of the x and y components, respectively, of the control points. The so-called "bounding box" is arranged to contain the surface patch and to be aligned with the coordinate axes. At each stage in the subdivision process, the address generator computes whether the Fay intersects this bounding box. The subdivision process continues until a desired resolution is obtained. This subdivision technique, apparatus fop carrying out the technique and the further read-side processes and apparatus are described in co-pending UK patent application GB-A-2,254,751, corresponding to U.S. patent application no. 07/853,437, filed Mar. 18, 1992, the content of which is incorporated herein by reference. Accordingly, only a brief description of the read side of the memory 13 is included herein.

Figure 14:
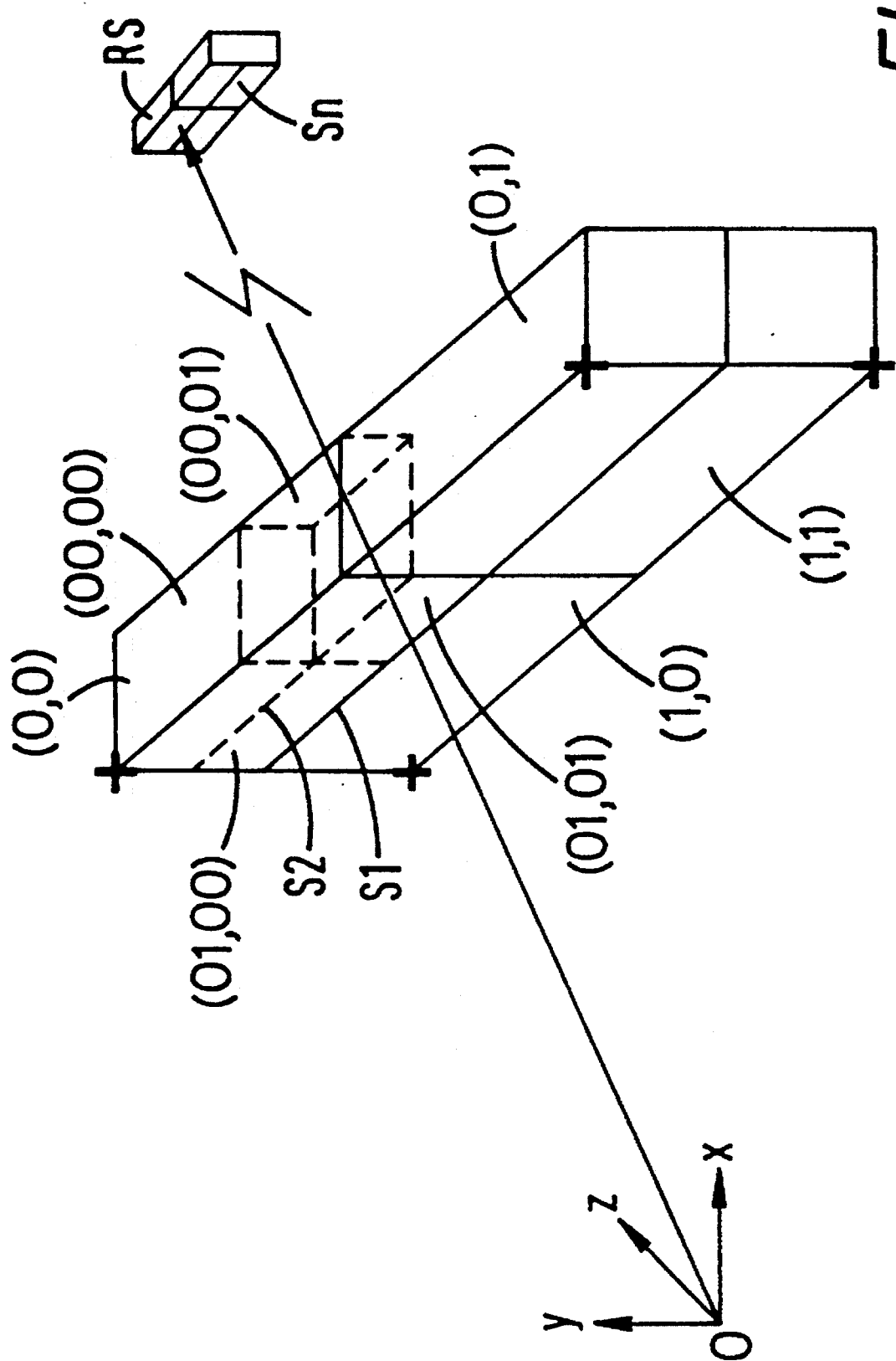
FIG. 14 is a schematic diagram for illustrating the operation of the pay tracing and subdivision address generator which forms part of the system illustrated in FIG. 5.

The sub-division process is illustrated schematically in FIG. 14. Conceptually, each of the rays starts from an origin '0' and passes through object space. FIG. 14 illustrates a situation where an intersection has been established for the top left bounding box from the first subdivision S1 and a second subdivision S2 has been made within this bounding box as indicated by the dotted lines. This process continues until the desired resolution or accuracy has been achieved (here at subdivision Sn), and a result sub-patch RS can be determined. As illustrated in FIG. 14, the rays for respective pixels diverge from the origin '0'. However, such a diverging ray system provides severe processing penalties when testing whether an intersection between a ray and a bounding box has occurred. The preferred embodiment of the invention uses an approximation to the diverging ray approach in which parallel rays are employed, as will be described later.

FIG. 14 is a flow diagram setting out the basic steps in the subdivision process.

A depth value is set in a register at step 80. In step 82 the original patch is subdivided into four sub-patches by the appropriate calculations on the original control points, and the control points for the sub-patches are stored on a stack. Associated with the control points (x, y and z values) for each sub-patch are variables for assembling u, v and z values for that sub-patch.

The control points for the first sub-patch on the stack are taken at step 84 and a bounding box is computed for this sub-patch. At step 86 a test is performed to see if the current ray intersects the current bounding box. If no intersection with the bounding box is detected at step 86, this sub-patch is discarded at step 88. If it is determined at step 90 that there is a further sub-patch on the stack, the logic branches back and the control points for the next sub-patch are taken from the stack at step 84. If no sub-patches are left on the stack the process terminates at step 92, the output of the process being the read address as derived from the u and v values stored in an output register which were accumulated for the result subpatch for which the closest intersection was detected. The horizontal address is generated by multiplying u by the maximum horizontal address (typically 1920 for high definition television). The vertical address is generated by multiplying v by the maximum vertical address (typically 1035 for high definition television).

If, at step 86 an intersection between the ray and the bounding box is detected, a test is made at step 94 as to whether the depth value for the sub-patch is less than the depth in the depth register. If it is, then a test is made at step 96 to determine whether the desired resolution has been obtained. If the tests at step 94 and step 96 ape both positive, the depth for the result sub-patch is stored in the depth register at step 98 and the u and v values for the sub-patch ape stored in the aforementioned output register for subsequent output in step 92. The data stored in the depth and output registers overwrite any data previously stored there. If the depth value for the sub-patch is determined, in step 94, to be greater than or equal to the content of the depth register, then the result sub-patch is discarded at step 88 and processing continues at the test at step 90, to determine whether there is a further sub-patch to be processed. If, in step 96, it is determined that the desired resolution has not yet been obtained for a given ray intersection, the process branches back to step 82 where the current sub-patch is further subdivided into four sub-patches, the control points and the u, v and z data relating to the four sub-patches being added to the top of the stack.

The address generator produces a key signal $K_o$ for each object image pixel, the key signal $K_o$ having a first value for object image pixels for which an intersection is found (i.e. within the object) and a second value for object image pixels for which no intersection is found (i.e. outside the object).

Due to compression and/or rotation, the locations of the mapped samples may not correspond to exact pixel sites of the output image signal or output array. Accordingly, the spatial subdivision process is preferably performed to sub-pixel accuracy. In this way, the address generated by the address generation logic comprising a major address portion (e.g. 12 bits for high definition), which is used for addressing the memory 13 and a residual address portion (e.g. 4 bits) which is used for controlling a pixel interpolator 14 which is positioned after the memory 13. The pixel interpolator is responsive to the value of the position increment between the location in the filtered image specified by the major address portion and the exact position in the filtered image which would map onto the current object pixel, as represented by the residual address portion, to interpolate between the values of available filtered input samples or words in the memory 13. The pixel interpolation logic does this to produce, for each object pixel, an interpolated sample or word which corresponds to that point in the input image which, using the mapping function, would map exactly on to the selected object pixel site. That interpolated sample or word, rather than specific input samples or words, is output from the pixel interpolation means. Thus, a precise desired relationship (as dictated by the mapping function) is maintained between pixels of the object image and the different positions of the memory 13. An interpolation technique of this type just set forth is described in UK Patent Application Publication No. GB-A-2 172 167 (Sony Corporation).

Figure 16A:
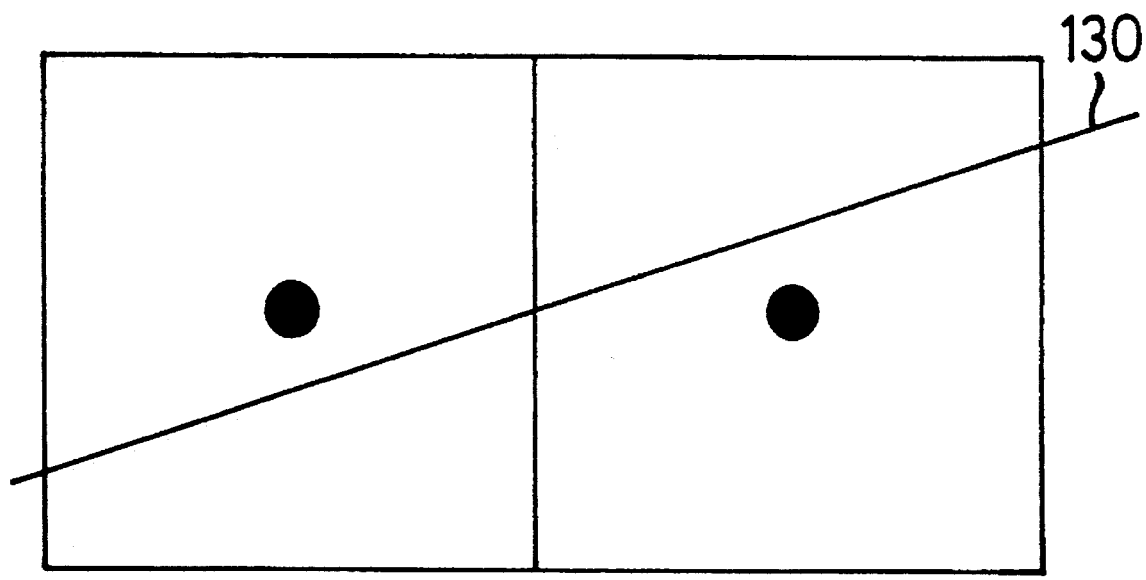
FIGS. 16A and 16B are used to explain the processing of picture edges.
Figure 16B:
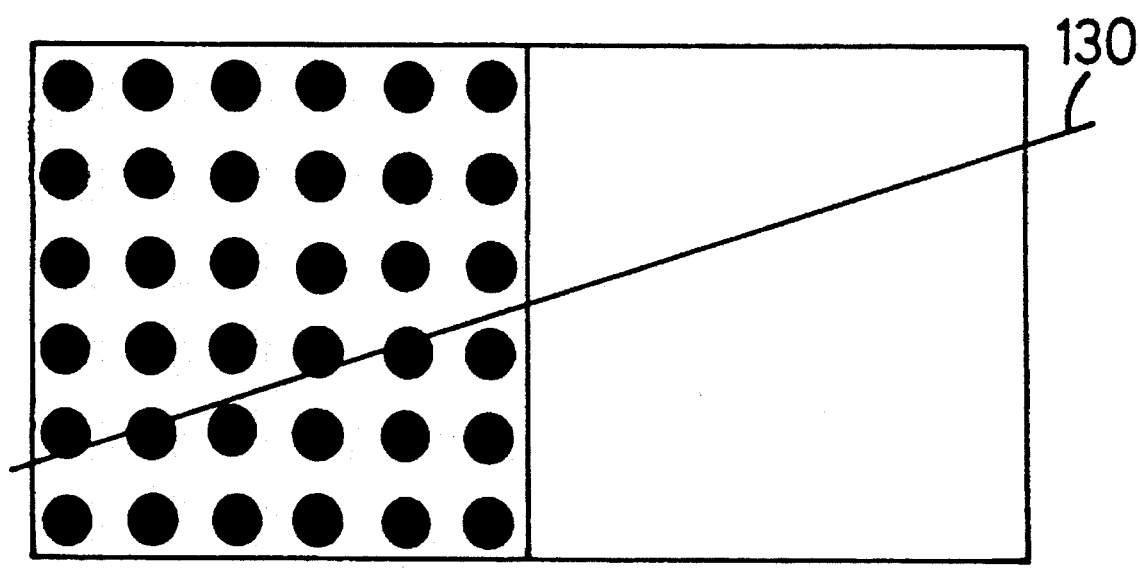

If the subdivision process is taken to a sub-pixel resolution, this provides good mapping within the body of individual objects. However, it can still lead to aliased edges of those objects. FIGS. 16A and 16B illustrate this problem and the solution to the problem respectively. FIG. 16A illustrates two adjacent cells each corresponding to a respective pixel position, with a single ray centred on the centre of each pixel. The edge 130 of an object passes through the pixel cells with the object defined to the bottom and right of the object edge. It can be seen that the ray in the left hand pixel position lies outside the edge of the object. The ray for the right hand pixel position, however, lies within the object. The result of sampling as indicated in FIG. 16A would produce an output image with the left-hand pixel position being set to the background and the right-hand pixel being set to the image. This would clearly result in an aliased, or jagged, edge.

FIG. 16B illustrates the approach which was adopted in the system described in the aforementioned co-pending UK application GB-A2,254,751. Where an edge is detected, at the desired pixel resolution, multiple rays are fired at the pixel position, in order to determine the percentage of the patch centred on that pixel which is contained within the object. In FIG. 16B, for example from the 36 rays fired at the left hand pixel position, 15 rays are seen to intersect the object. This information can be used in order to set that pixel to an appropriate value. However, it will be noted that in order to be able to set the intensity of that pixel at the correct value, the intensity of the adjacent object, or background, needs to be ascertained. As a result of this, the edge detection and processing is performed by an edge detector 36 and an edge processor 38 in the key control processor 23. The output of the key control processor is in the form of an anti-aliased edge map which is superimposed on the output from the memory 13 and pixel interpolator 14 to generate an output video signal as indicated schematically in FIG. 5.

Figure 15:
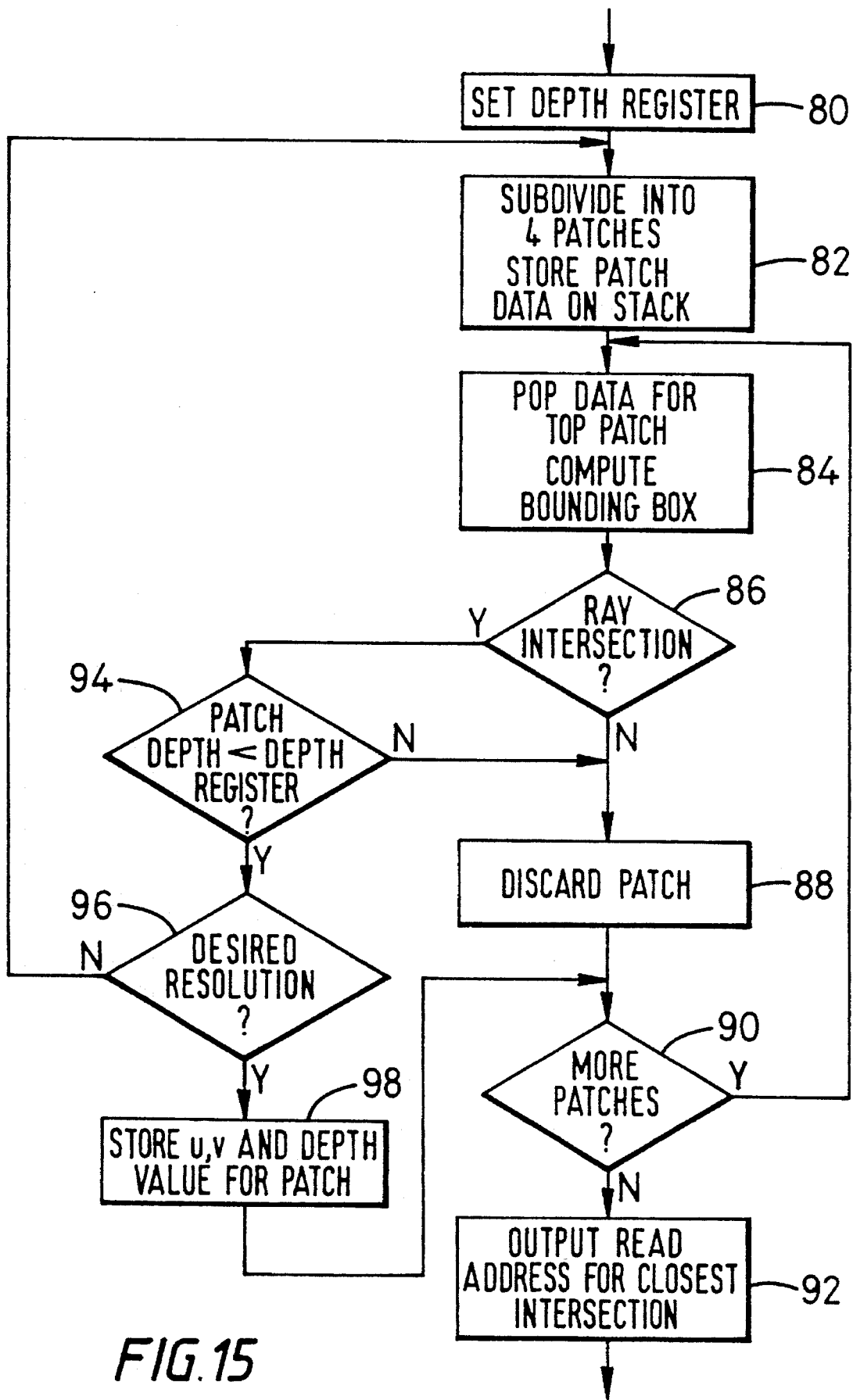
FIG. 15 is a flow diagram of logic forming part of the ray tracing and subdivision address generator.

The edge detection logic operates by comparing groups of four pixel cells. The edge detection logic tests whether, within any group of four pixel cells there are: (a) four hits; (b) four misses; or (c) a mixture of hits and misses and/or address discontinuities. In cases (a) and (b) the edge detection logic detects that no edges occur within that group of four pixel cells. Where a mixture of hits and misses are found, it is assumed that an object background edge passes within that group of four pixel cells. Where an address discontinuity is detected, it is assumed that there is a fold or the like in the object surface. In both these latter cases, the area of four cells is then supersampled by firing more rays within that group of four cells to determine the exact path of the edge. The sub-division address generation process as described above with reference to FIGS. 14 and 15 is performed for each of the rays to determine the memory address of the appropriate source pixel (or group of source pixels where there is no exact mapping) which will determine an image value For that ray. The result of each of the further ray tracing operations for each pixel cell are then averaged to determine an edge value for that pixel cell. It is these averaged pixel cell values which are then output to form the edge map to be superimposed on the output image data in the keyer 17.

The aforementioned co-pending UK patent application GB-A-2,254,751, which is incorporated herein by reference, describes an example of an edge detector 36 and an edge processor 38 which can be used in an embodiment of the present invention. Accordingly, the operation of the edge detector 36 and the edge processor 38 shown in FIG. 5 will only be described in general terms herein.

The edge detector 36 includes control logic for performing the comparison of the groups of four pixel cells as described above with reference to FIG. 17. In order that it may compare the addresses generated by the address generator 21, it receives the addresses output by the address generator via the address bus 133 (see FIG. 5). The edge detector produces an edge key signal $K_e$ having a first value for pixels corresponding to an edge, and a second value for other pixels.

The edge processor 38 comprises circuitry for performing the ray trace and sub-division processing as described above with reference to FIG. 15 but for a plurality of rays within a pixel cell identified as being on an edge by the edge detector 36. In the particular example of an edge processor described in co-pending UK application GB-A2,254,751, the edge processor 38 receives the output of the filter 12 via data path 141. In addition, the edge processor receives background information over the bus 145 (see FIG. 5) in order that background-object edge supersampling may be performed. The edge processor further determines individual intensity values for the constituent rays, these being collated and processed to generate a composite intensity value for each pixel cell. These pixel cell values are aligned so that they may be output over a data bus 144 to be keyed with the output pixels from the pixel interpolator 14 and for merging with the background information to generate the composite output picture.

Figure 17:
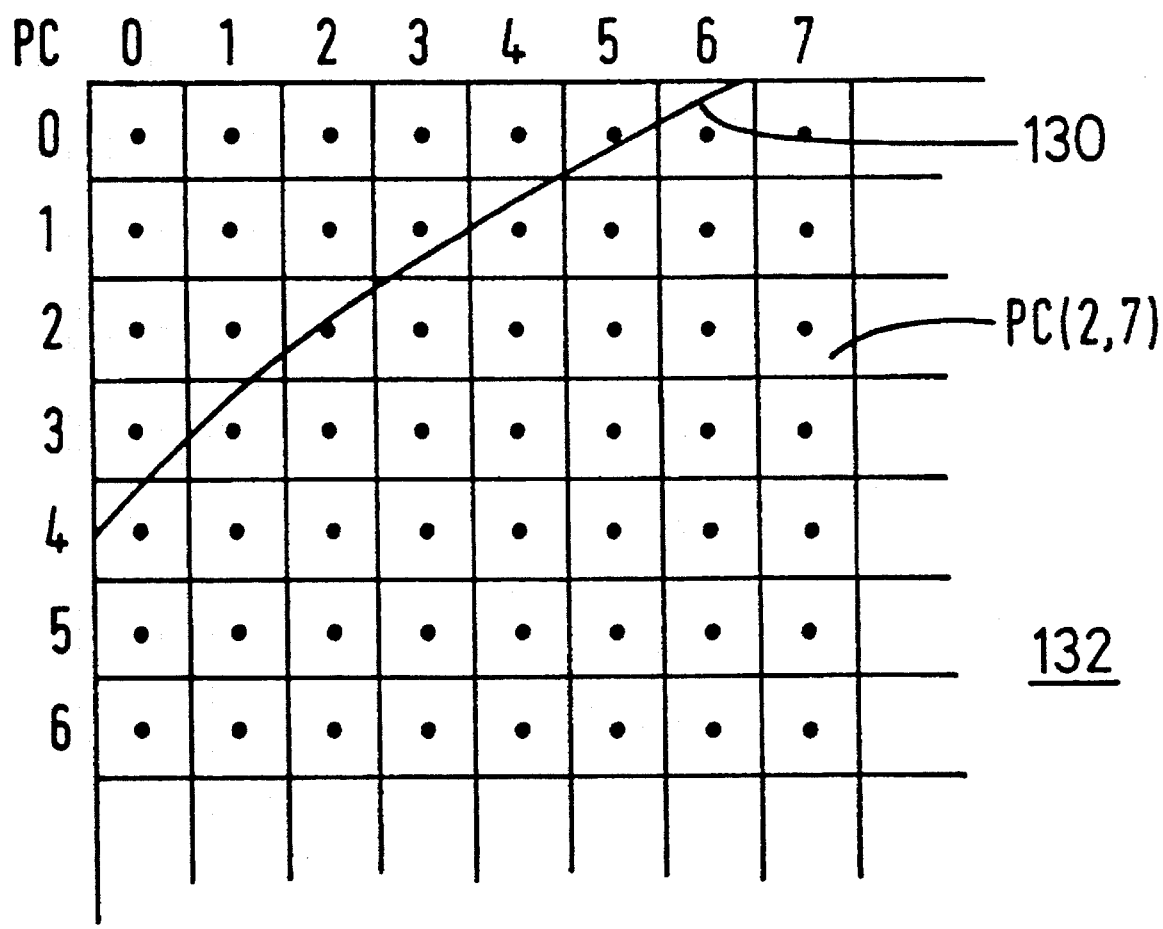
FIG. 17 is used to explain the operation of an edge detector for use in the system of FIG. 5.
Figure 18:
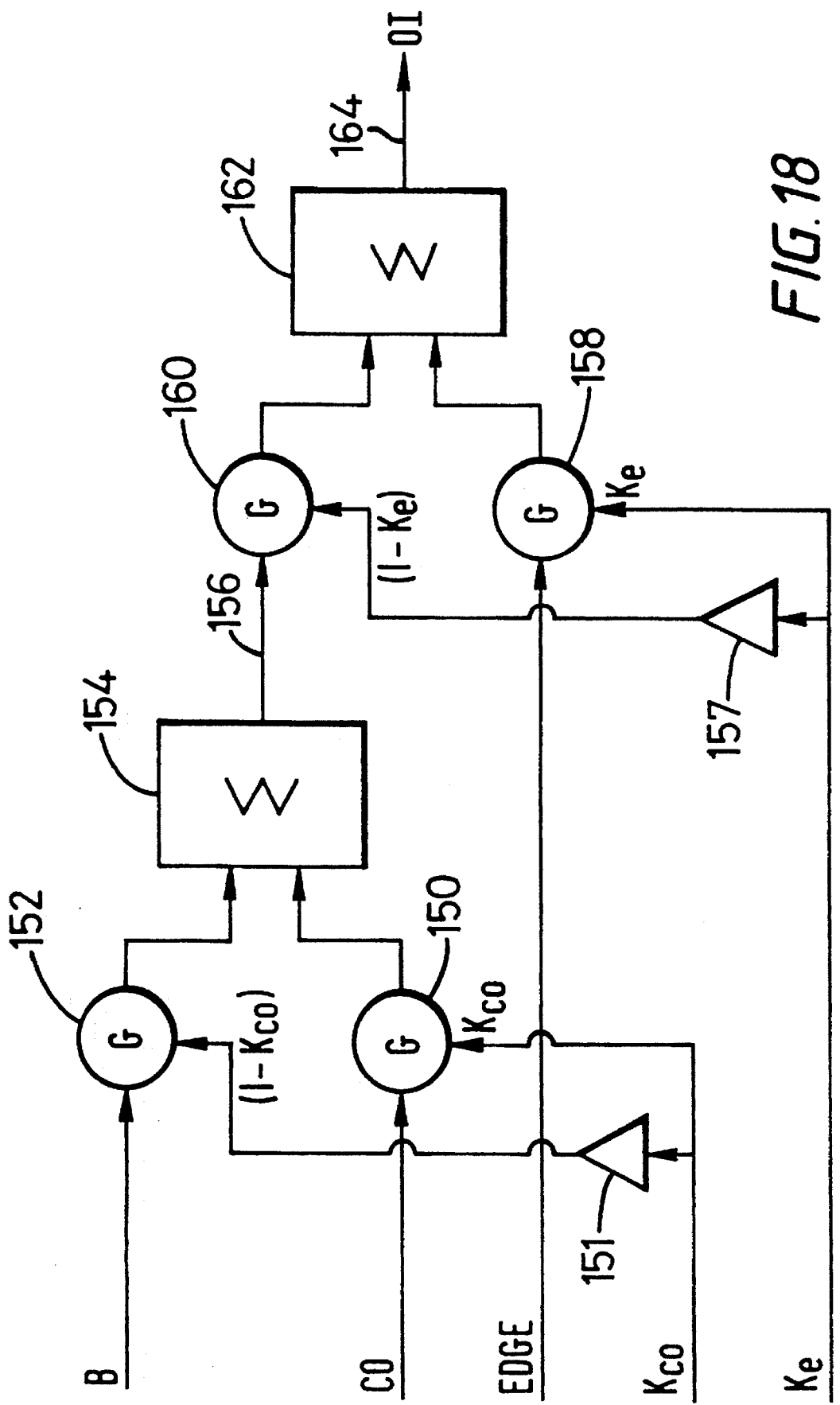
FIG. 18 is a schematic diagram of a keyer for the system illustrated in FIG. 5.

FIG. 17 is a schematic overview of the keyer 17 of FIG. 5. The keyer receives as input, background information B representative of background information for forming the background of the output image OI, the object image pixels of the object image 0, the edge pixels of the edge image EDGE, a key signal $K_o$ for the object image, and a key signal $K_e$ for the edge image. The key signal for the object image $K_o$ is in the form of one's and zero's defining a mask identifying which pixels of the object image 0 and which pixels from the background are to be displayed on the screen. Thus, the key signal $K_o$ is used to control a gate 150 for gating the object image 0. The inverse of the signal $K_o$, produced by an inverter 151 is used to control a gate 152 for gating the background image information. The output of the gates 150 and 152 are combined in an adder 154 to generate the basic output signal on a line 156. In order to avoid edge aliasing effects, the edge image EDGE is superimposed on the output of the adder 154. The key signal $K_e$ is used for controlling a gate 158 to gate the edge signal EDGE. An inverter 157 inverts the signal $K_e$, the inverted signal being used to control a gate 160 for gating the output of the adder 154 on the line 156. The output of the gates 158 and 160 are added in an adder 162 to produce the output image on the line 164. The effect of the keyer shown in FIG. 17 is to superimpose the object image 0 on the background in accordance with the mask defined by signal $K_o$, and then, on the result of that superimposition, to further superimpose the edge pixels defined by the signals EDGE in accordance with the key signal $K_e$.

There has been described a digital video effects system which enables video texture mapping onto non-linear object surfaces. It will be appreciated that many additions and/or modifications to the particular system described are possible within the scope of the present invention.

For example, although an example of the invention providing lighting effects has been described in the context of an example for providing video texture mapping onto non-linear object surfaces, the invention is also applicable to a digital video effects system which provides mapping onto linear object surfaces. In this case, alternative address generation and key processing circuitry may be provided.

Also, although in the preferred embodiment of the invention, the tile normals are assumed to be defined at one corner of a tile, in alternative embodiments the tile normals could be interpreted to be at the centre of a tile. However, in such a case, the interpolation of pixels adjacent to the edge of the active picture area could be generating further normals for tiles outside the active image area by extrapolation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A digital video effects system for mapping a source video image comprising an array of pixels onto an object surface to produce an output image, said system comprising:

write-side lighting effect means for modifying light intensities of the pixels from said source video image, memory means for storing the modified light intensity pixels, control means for establishing a surface function defining said object surface, and address means for computing read addresses for mapping the modified light intensity pixels from said memory to form output pixels representative of said source video image mapped onto said object surface with lighting effects.

2. A system as claimed in claim 1 further comprising mapping means for logically sectioning said source image into a plurality of tiles such that each tile corresponds to an array of pixels of said source image, said mapping means being responsive to said surface function for computing a mapping of tile corner coordinates onto said object surface.

3. A system as claimed in claim 2 wherein said write-side lighting effect means comprises a lighting effect processor responsive to lighting factors produced by a lighting factor generator to selectively modify the light intensities of pixels from said source image, said lighting factor generator comprising means for generating a pixel intensity modification factor for each pixel of the source image from said mapped tile coordinates generated by said mapping means.

4. A system as claimed in claim 3 wherein said lighting factor generator further comprises means for determining a normal for each tile by calculating a cross product of two vectors, each of which vectors is defined with respect to said mapped coordinates of diametrically opposed corners of said tile.

5. A system as claimed in claim 3 wherein said lighting factor generator further comprises means for determining normals for each mapped pixel by interpolating a plurality of tile normals.

6. A system as claimed in claim 3 wherein said lighting factor generator further comprises means for determining the distance between a pixel and a light source from coordinates of said pixel mapped onto said object surface and the coordinates of said light source.

7. A system as claimed in claim 3 wherein said lighting factor generator further comprises means for determining mapped coordinates for each pixel Of the source image by interpolating mapped tile corner coordinates for a tile to which said pixel belongs.

8. A system as claimed in claim 3 wherein said pixel intensity modification factor (IF) is defined by:

$$IF = KdIa + \frac{KdId(N \cdot L)}{d + d\emptyset}$$

where:

N.L represents a dot product of an interpolated pixel normal N and a lighting vector L;

Id represents an intensity of a diffuse light source;

Ia represents an intensity of an ambient light source;

Kd represents a coefficient of reflection;

d represents a distance between a pixel and a light source; and d∅ represents a constant.

9. A system as claimed in claim 2 further comprising filtering means for filtering the modified light intensity pixels by applying variable filter characteristics in accordance with local scaling factors for said tiles to which said modified light intensity pixels belong, and wherein said memory means is operative to store the filtered pixels.

10. A system as claimed in claim 9 further comprising scale factor generating means responsive to said tile corner coordinate values for generating said filter scaling factors for respective ones of said tiles.

* * * * *